Aug. 9, 1938.   H. A. FOOTHORAP   2,126,320
COMBINED CALCULATING AND RECORDING MACHINE
Original Filed Dec. 30, 1932   21 Sheets-Sheet 5

INVENTOR.
BY Harry A. Foothorap.
ATTORNEY.

Aug. 9, 1938.     H. A. FOOTHORAP     2,126,320
COMBINED CALCULATING AND RECORDING MACHINE
Original Filed Dec. 30, 1932   21 Sheets-Sheet 6

INVENTOR.
Harry A. Foothorap.
BY
L. G. Julihn
ATTORNEY.

Aug. 9, 1938.   H. A. FOOTHORAP   2,126,320
COMBINED CALCULATING AND RECORDING MACHINE
Original Filed Dec. 30, 1932   21 Sheets-Sheet 7

INVENTOR.
Harry A. Foothorap.
BY
L. G. Julihn
ATTORNEY.

Aug. 9, 1938.  H. A. FOOTHORAP  2,126,320
COMBINED CALCULATING AND RECORDING MACHINE
Original Filed Dec. 30, 1932   21 Sheets-Sheet 8
Fig. 11.
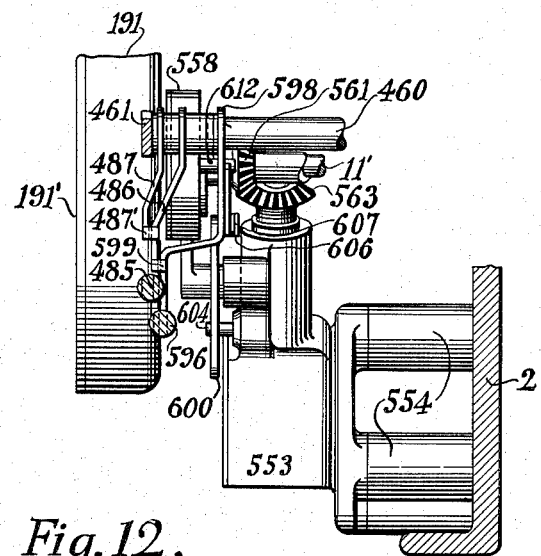
Fig. 14.
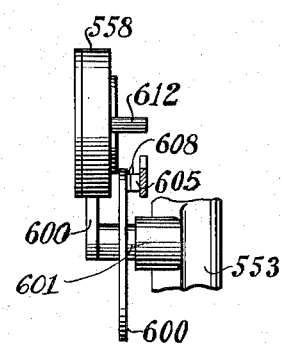
Fig. 12.
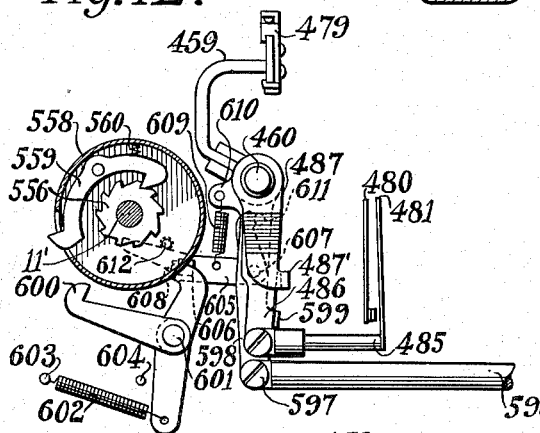
Fig. 13.
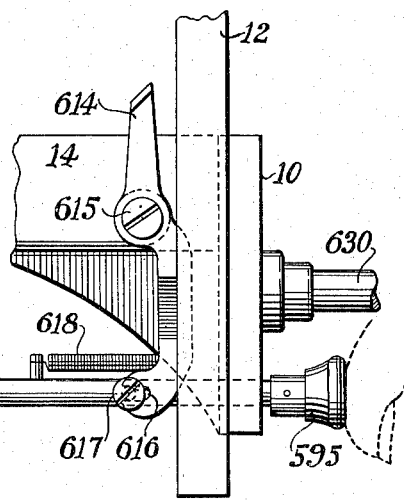
Fig. 15.
INVENTOR.
Harry A. Foothorap.
BY L. G. Julihn
ATTORNEY.

Aug. 9, 1938.    H. A. FOOTHORAP    2,126,320
COMBINED CALCULATING AND RECORDING MACHINE
Original Filed Dec. 30, 1932    21 Sheets-Sheet 9

INVENTOR.
Harry A. Foothorap.
BY
L. G. Julihn
ATTORNEY.

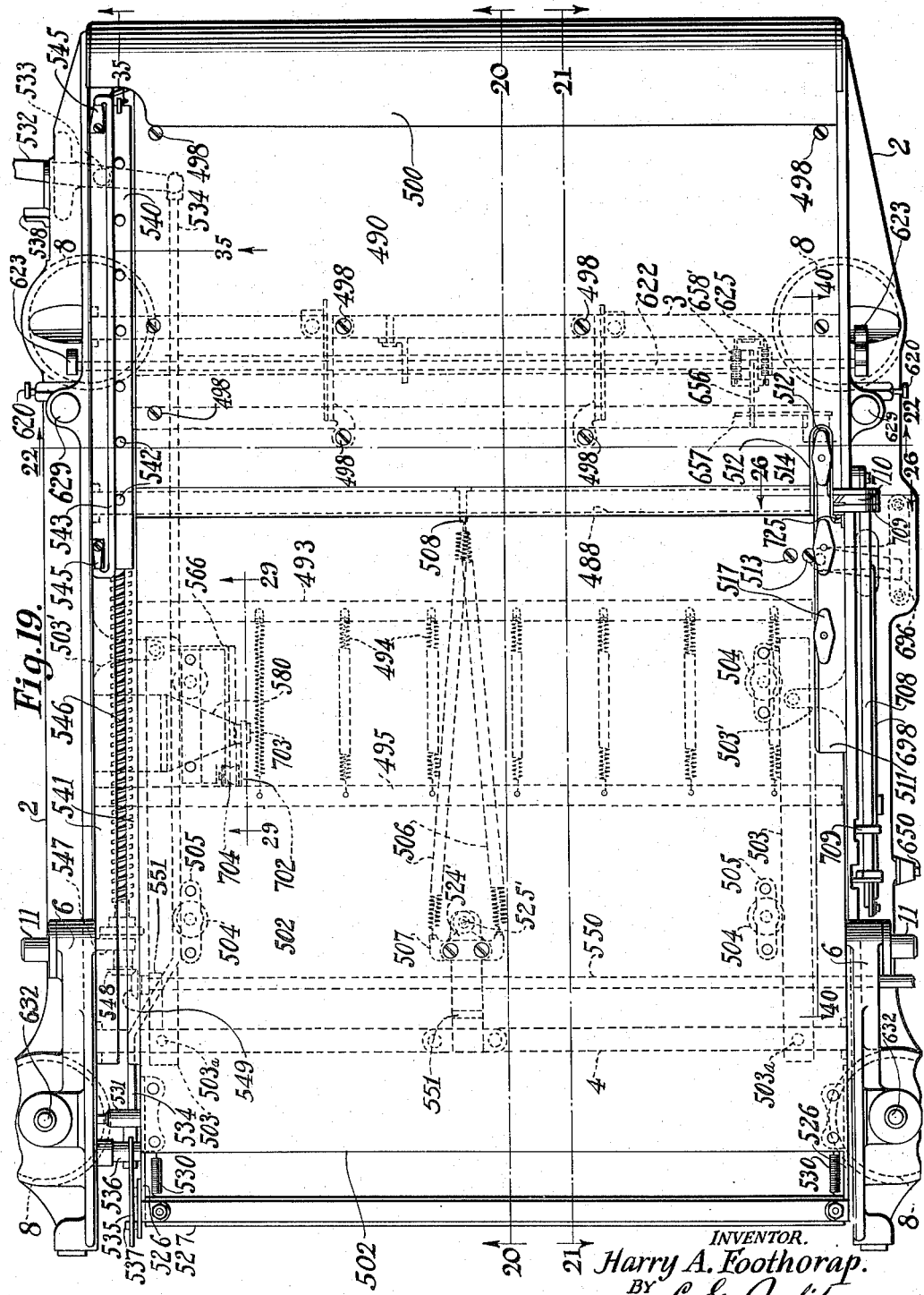

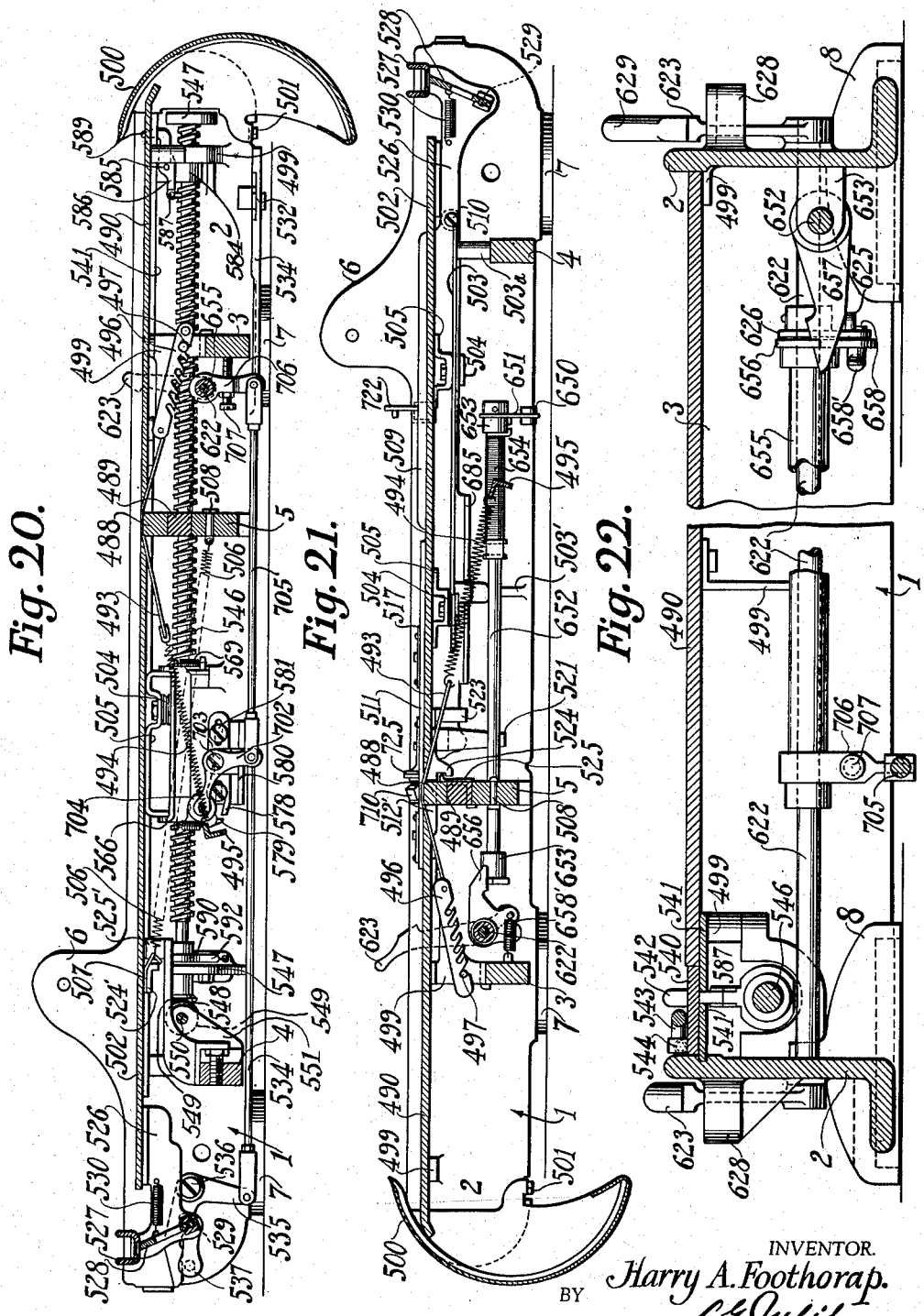

Aug. 9, 1938.     H. A. FOOTHORAP     2,126,320
COMBINED CALCULATING AND RECORDING MACHINE
Original Filed Dec. 30, 1932     21 Sheets-Sheet 12
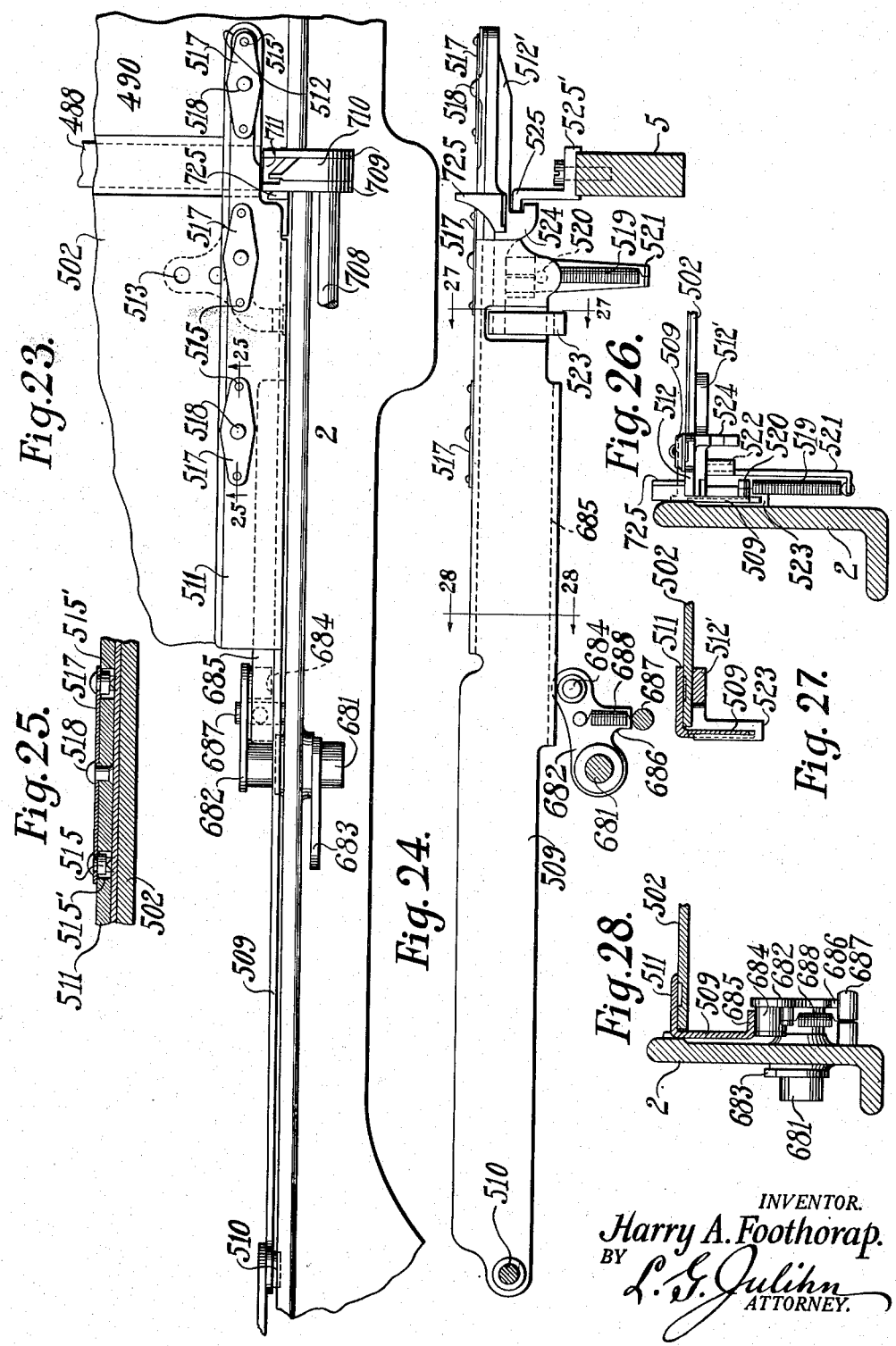
INVENTOR.
Harry A. Foothorap.
BY L. G. Julihn
ATTORNEY.

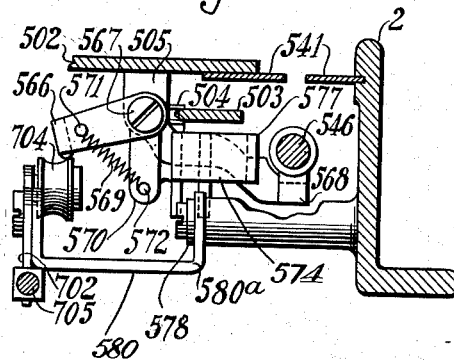
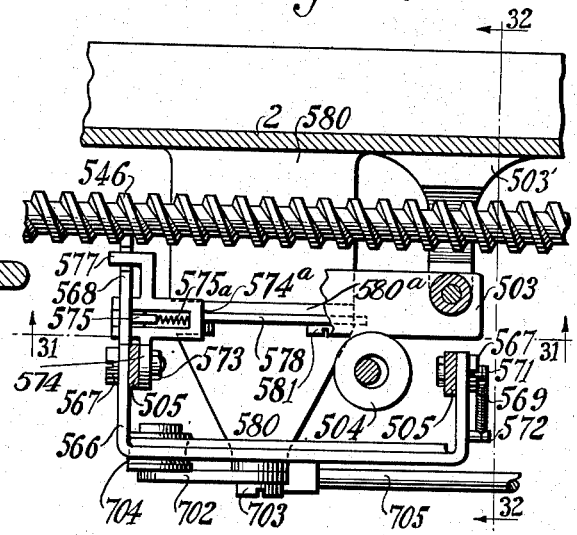
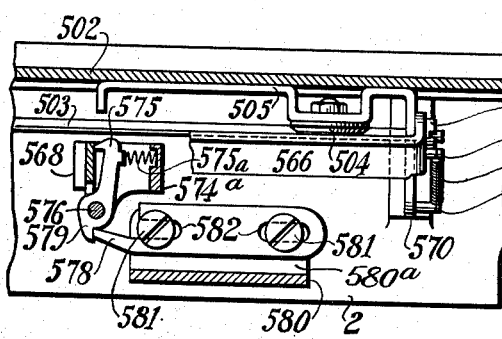
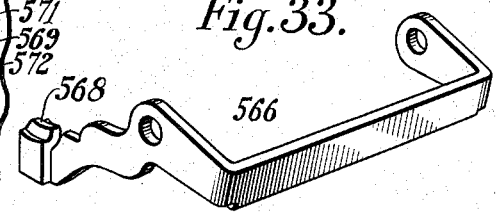
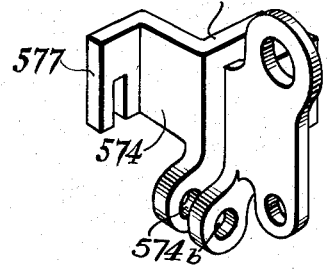
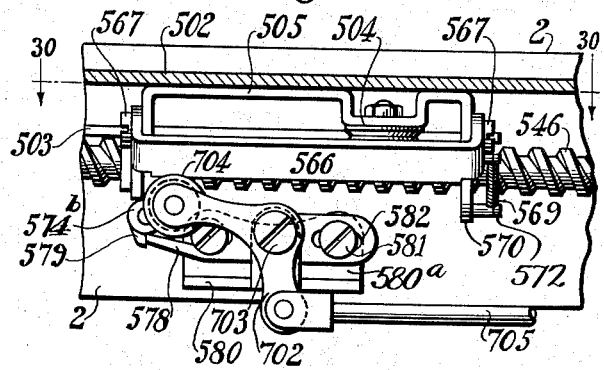

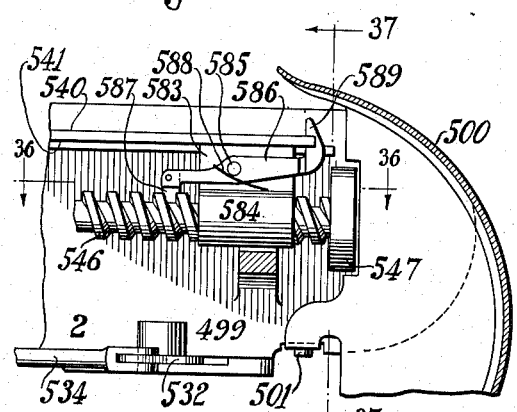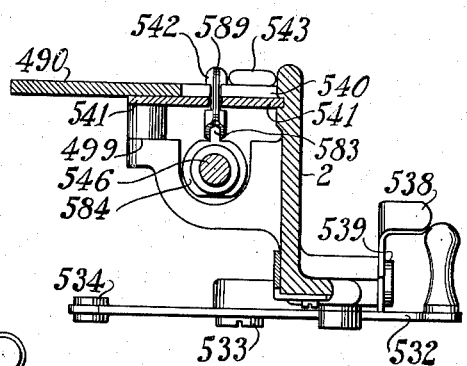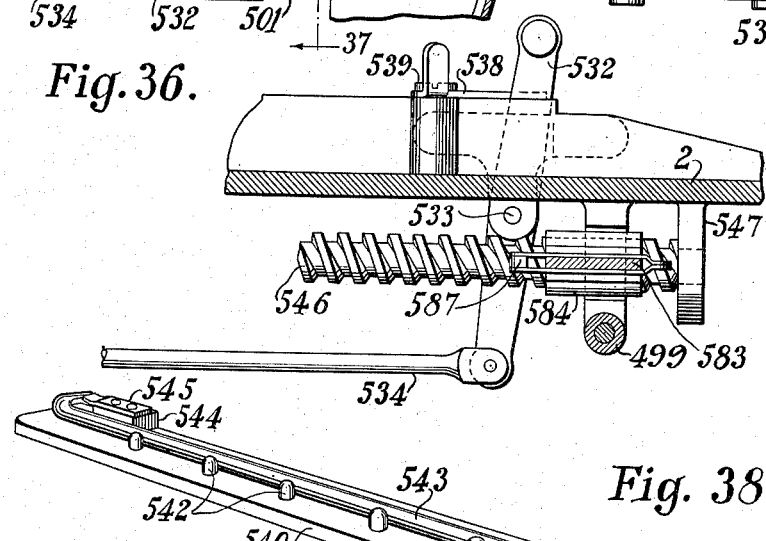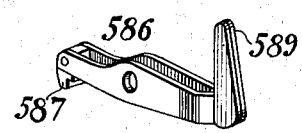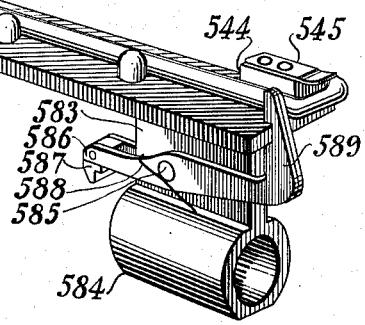

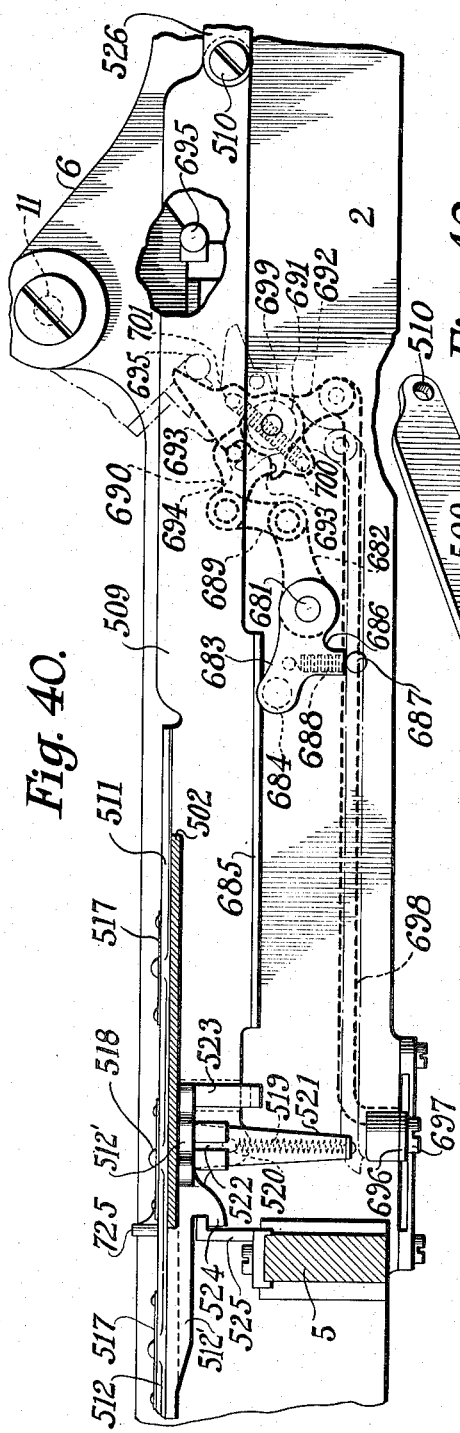
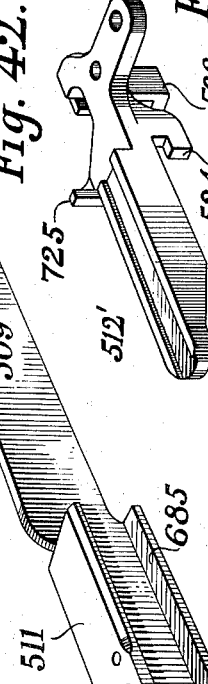
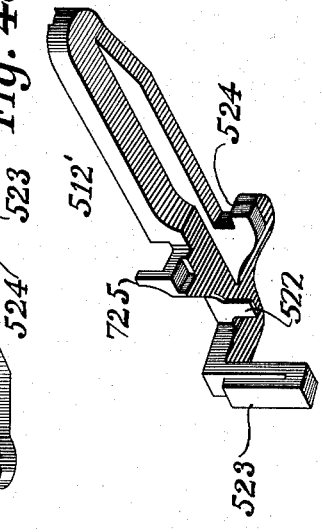
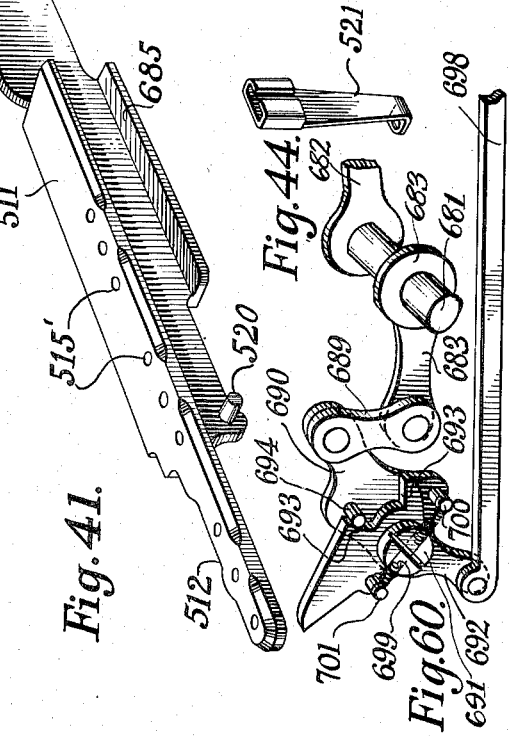
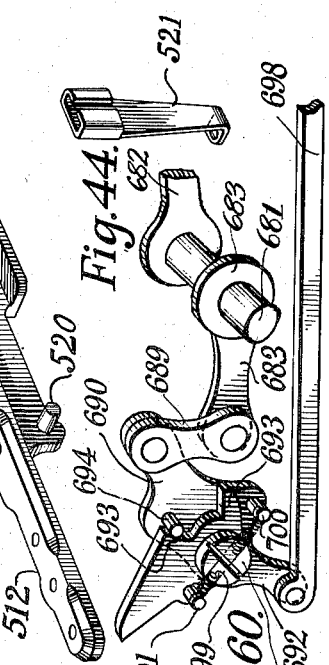
INVENTOR.
BY Harry A. Foothorap.
L. G. Julihn
ATTORNEY.

Aug. 9, 1938.　　　H. A. FOOTHORAP　　　2,126,320
COMBINED CALCULATING AND RECORDING MACHINE
Original Filed Dec. 30, 1932　　21 Sheets-Sheet 16
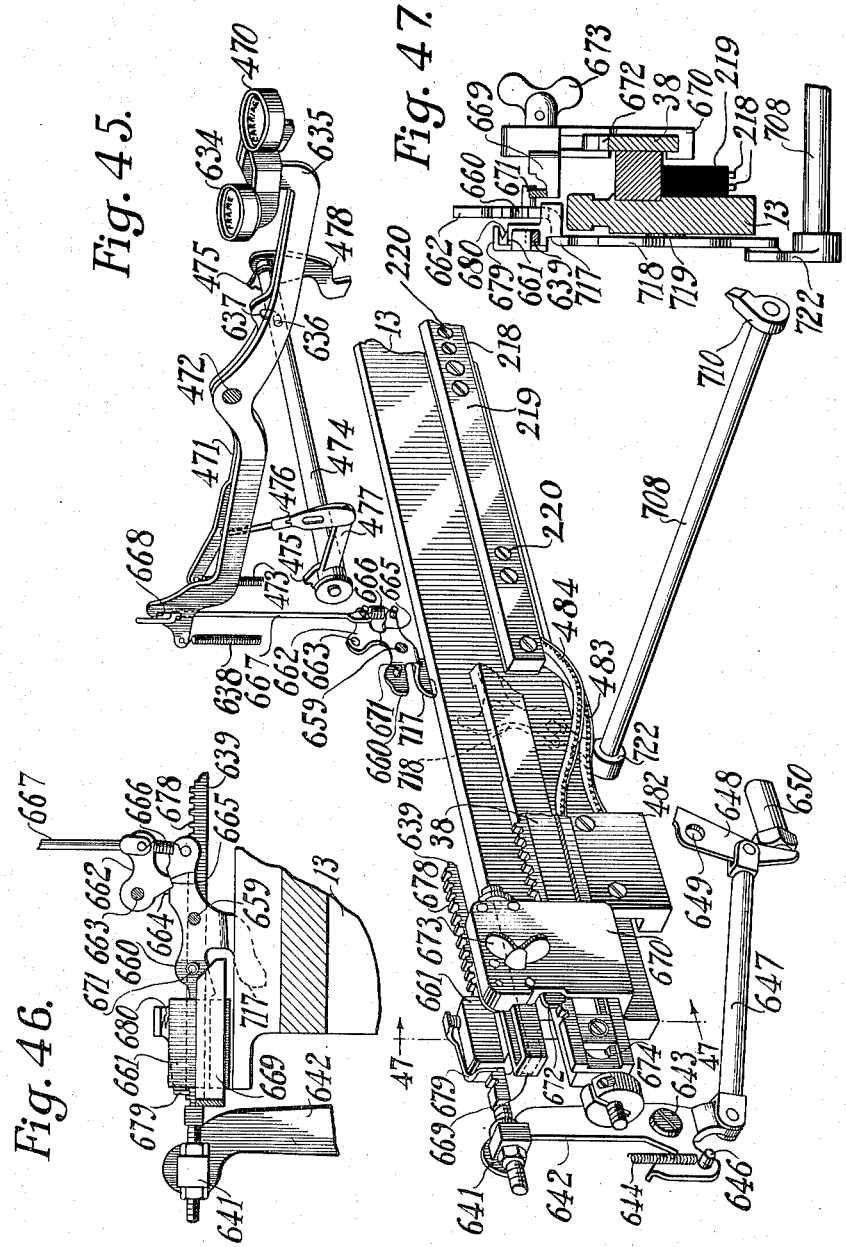
INVENTOR.
Harry A. Foothorap.
BY L. G. Julihn
ATTORNEY.

Aug. 9, 1938.    H. A. FOOTHORAP    2,126,320
COMBINED CALCULATING AND RECORDING MACHINE
Original Filed Dec. 30, 1932    21 Sheets-Sheet 17
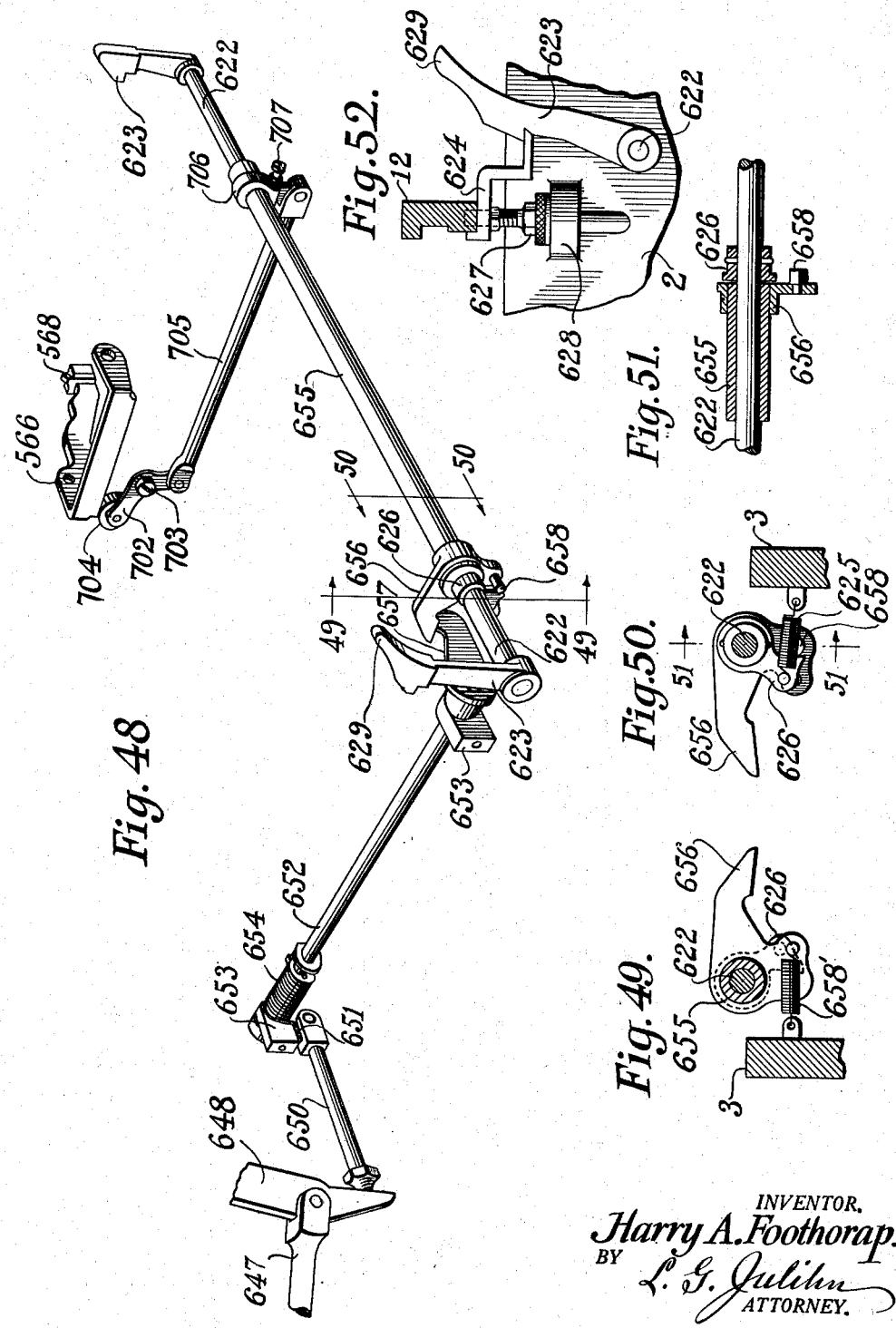
INVENTOR.
Harry A. Foothorap.
BY
L. G. Julihn
ATTORNEY.

Aug. 9, 1938. H. A. FOOTHORAP 2,126,320
COMBINED CALCULATING AND RECORDING MACHINE
Original Filed Dec. 30, 1932 21 Sheets—Sheet 20

INVENTOR.
Harry A. Foothorap.
BY
L. G. Julihn
ATTORNEY.

Aug. 9, 1938.　　　H. A. FOOTHORAP　　　2,126,320
COMBINED CALCULATING AND RECORDING MACHINE
Original Filed Dec. 30, 1932　　21 Sheets—Sheet 21

INVENTOR
Harry A. Foothorap.
BY
L. G. Julihn
ATTORNEY

Patented Aug. 9, 1938

2,126,320

UNITED STATES PATENT OFFICE 2,126,320

COMBINED CALCULATING AND RECORDING MACHINE

Harry A. Foothorap, Harrisburg, Pa., assignor to Underwood Elliott Fisher Co., New York, N. Y., a corporation of Delaware Original application December 30, 1932, Serial No. 649,663. Divided and this application November 11, 1935, Serial No. 49,158

58 Claims. (Cl. 197—2)

My invention relates to combined calculating and recording machines, and more particularly to improvements in combined calculating and typewriting machines of the class known commercially as the Elliott-Fisher billing machine.

This application constitutes a division of my co-pending original application filed December 30, 1932, Serial No. 649,663.

By way of explanation, the Elliott-Fisher machine, with which my invention is particularly concerned, is a combined calculating and typewriting mechanism distinguished, in its typewriting aspect, by down strike printing mechanism, and keys mounted on a carriage to travel over a subjacent flat platen. Viewed in its computing aspect, it is characterized by one or more so-called column registers past which the carriage travels, a grand totalizer or crossfooter register mounted on and travelling with the carriage, and column and crossfooter register master wheels or actuators mounted on the carriage and crossfooter register frames, respectively, to effect denominational selection in their related registers incident to the step by step letter spacing travel of the carriage, and operated in synchronism by the number of keys of the machine, to accumulate values in the registers as they are printed digit by digit in different columns. Usually the carriage is adapted to travel over the work to both line and letter space the printed record.

One object of my invention is to provide, in such a machine, a shiftable frame supporting the carriage and registers, which frame is shiftable, at an angle, from and to the plane of the work, differential mechanism on the carriage for operating the registers under control of the keys, and a motor on the frame in constant driving relation to the differential mechanism on the carriage in any position of the latter.

An important object is to provide, in a machine equipped as above set forth, work feeding means beneath the shiftable frame, including driving mechanism connected to the motor on the frame in any position of the frame.

Another object is to provide motor means urging said frame into a position in which the typing mechanism is ineffective, and means for both manually and automatically controlling the shifting of the frame to such position.

Another object is to provide novel means to clamp the work to the feeding means and to automatically release the clamping means, when the frame is shifted away from the work.

Still another object is to provide for the automatic disconnection of the driving mechanism of the work feeding means when the work is automatically released.

Still another object is to provide means for automatically notching the work, and locating the same in exact line position.

A further object is the provision of means under control of the carriage to notch the work sheet; to shift the frame to uncover the work; to disable the line spacing mechanism, and to release the work clamping means, all as a result of one operation.

To the accomplishment of the foregoing and other and subordinate objects, one embodiment of the invention has been illustrated in the accompanying drawings and will now be set forth in detail, and defined in the claims appended hereto.

Figure 9:
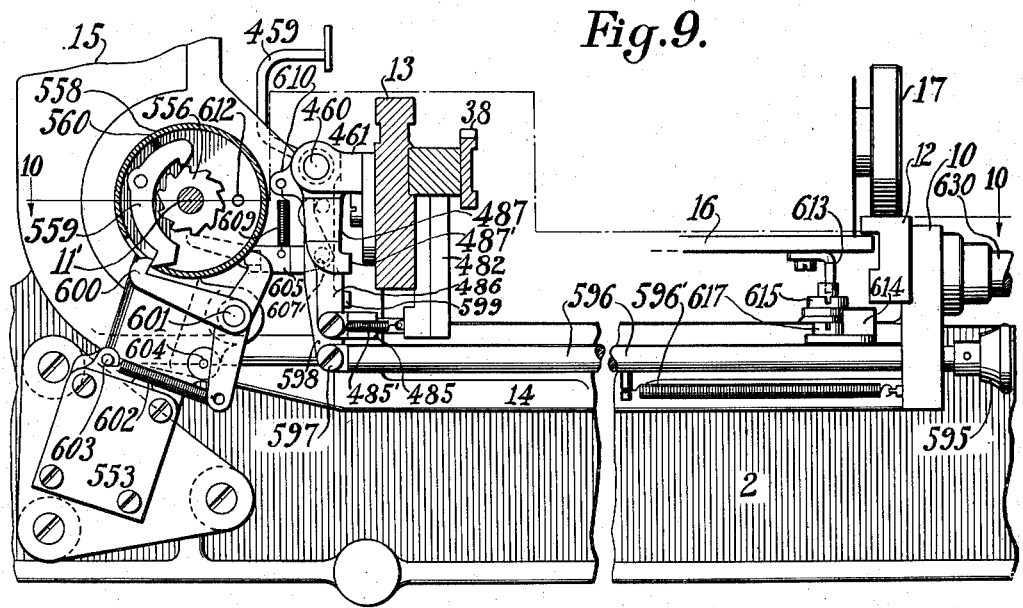
Figure 10:
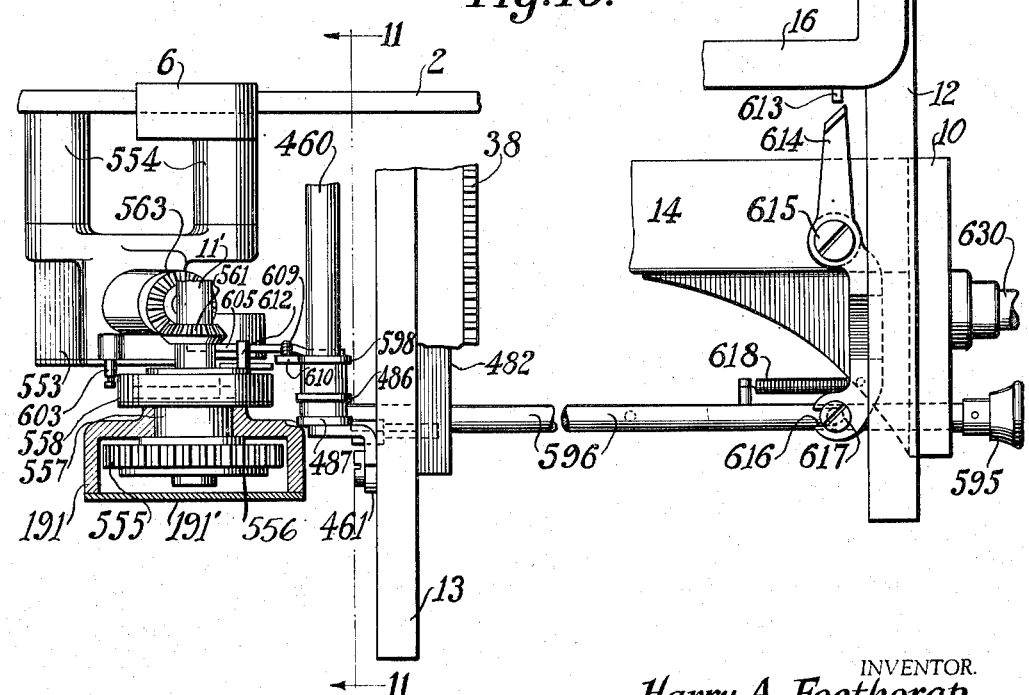
Figure 16:
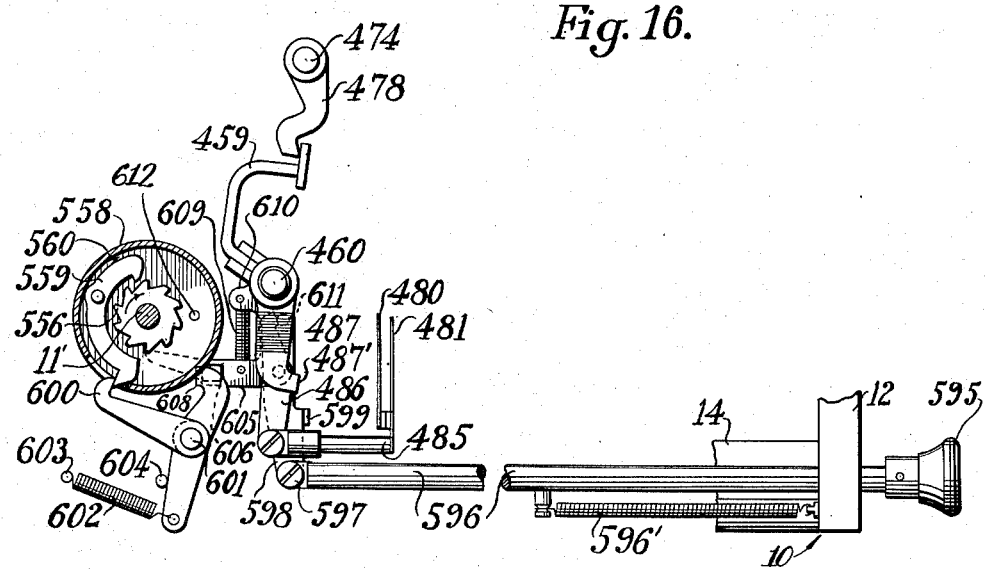
Figure 17:
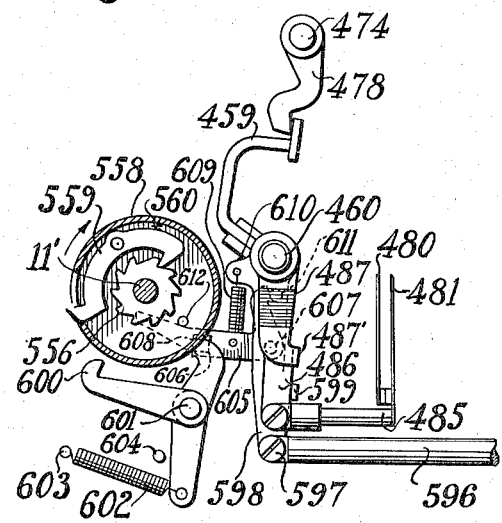
Figure 18:
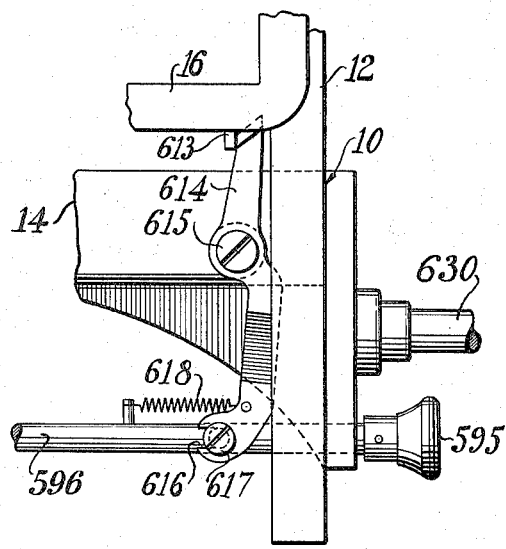

Fig. 9 is a fragmentary side elevation with parts in section, of the machine base, a tilting frame thereon, a carriage travelling on the frame, a carriage retracting bail, a normally disengaged line space clutch, a line space key controlling the clutch, means on the carriage and frame for automatically controlling said clutch, a normally open motor-controlling switch, means for closing the switch by operation of the carriage retracting bail, and means for engaging the clutch and closing the switch by operation of the line space key;

Fig. 10 is a top plan view, partly in horizontal section, taken on the line 10—10 of Fig. 9;

Fig. 11 is a transverse section taken on the line 11—11 of Fig. 10;

Fig. 12 is a fragmentary side elevation, partly in section, of the line space clutch, the carriage retracting bail, the motor-controlling switch, the means for closing the switch by operation of said bail, the line space key, and the means operated thereby for engaging the clutch and closing the switch, shown in their clutch engaging and switch closing positions;

Fig. 13 is a fragmentary top plan view of the line space key, a carriage operated line space lever, and connections between said key and lever, illustrating the relation of the parts in the clutch engaging and switch closing position of the line space key;

Fig. 14 is a view in front elevation of the line space clutch and associated parts;

Fig. 15 is a view similar to Fig. 12, illustrating the operation of means to limit the clutch to a single revolution;

Fig. 16 is a view similar to Fig. 12, with the line space clutch, line space key, and the clutch-engaging means operated by said key, all in normal clutch-disengaging position, and with the carriage retracting bail and means operated thereby for closing the motor-controlling switch shown in switch-closing position;

Fig. 17 is a view similar to Fig. 16, with the line space key and the means operated thereby for engaging the line space clutch shown in clutch-engaging position;

Fig. 18 is a fragmentary top plan view illustrating carriage operation of the line space lever and key;

Fig. 19 is a top plan view of the base of the machine, the work supporting and feeding means thereon, including a work table and a proof sheet carrier movable, respectively, for line spacing, line space mechanism for moving said table and carrier, carbon-clamping means, work-clamping means, work-notching means, and parts of the frame-latching mechanism mounted on said base.

Fig. 20 is a longitudinal section taken on the line 20—20 of Fig. 19, looking in the direction indicated by the arrows;

Fig. 21 is a similar view taken on the line 21—21 of Fig. 19, and looking in the opposite direction, as indicated by the arrows;

Fig. 22 is a transverse section taken on the line 22—22 of Fig. 19, looking in the direction indicated by the arrows, and drawn to an enlarged scale.

Figure 53:
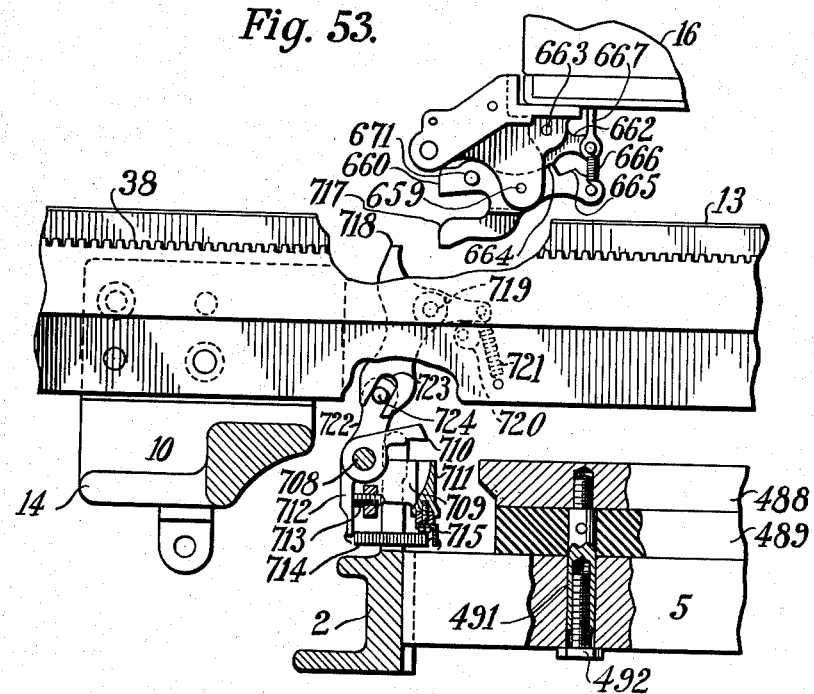
Figure 54:
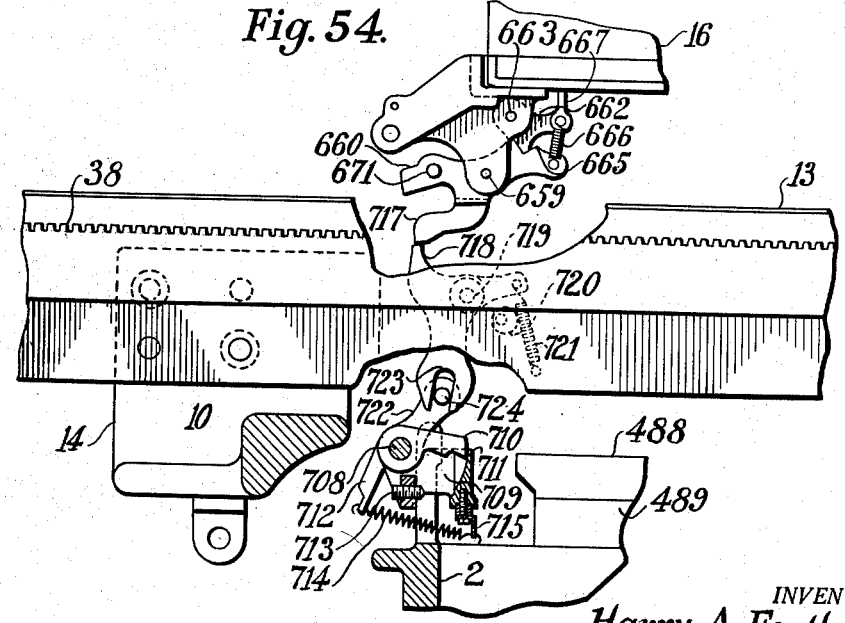

Fig. 23 is a fragmentary view of the work supporting and feeding means, including a platen, stationary and movable tables at the front and rear of the platen, respectively, work clamping means, and parts of the clamp-releasing means, and work-notching mechanism;

Fig. 24 is a side elevation, partly in section, illustrating details of the work-clamping means;

Fig. 25 is a sectional view taken on the line 25—25 of Fig. 23, and drawn to an enlarged scale;

Fig. 26 is a transverse sectional view taken on the line 26—26 of Fig. 19;

Fig. 27 is a similar view taken on the line 27—27 of Fig. 24;

Fig. 28 is another similar view taken on the line 28—28 of Fig. 24;

Fig. 29 is a longitudinal sectional view taken on the line 29—29 of Fig. 19, drawn to an enlarged scale, and showing a part of the movable work supporting table and its mounting, parts of a line space mechanism for moving said table, including a line space worm shaft, a clutch ball for clutching said table to said shaft, a bail latch and latch releasing means, and means for automatically releasing said table from the line space worm shaft;

Fig. 30 is a view in horizontal section taken on the line 30—30 of Fig. 29;

Fig. 31 is a longitudinal sectional view taken on the line 31—31 of Fig. 30;

Fig. 32 is a view in transverse section taken on the line 32—32 of Fig. 30;

Fig. 33 is a perspective view of the clutch ball for clutching the movable table to the line space worm shaft;

Fig. 34 is a perspective view of a combined stop bracket and mounting for the latch, associated with the clutch bail;

Fig. 35 is a view in longitudinal section taken on the line 35—35 of Fig. 19, drawn to an enlarged scale, and illustrating a proof sheet carrier, a clutch member thereon for clutching said carrier to the line space worm shaft, and parts of the carbon clamp releasing mechanism;

Fig. 36 is a view in longitudinal section taken on the line 36—36 of Fig. 35;

Fig. 37 is a view in transverse section taken on the line 37—37 of Fig. 35;

Fig. 38 is a perspective view of the proof sheet carrier and parts associated therewith;

Fig. 39 is a perspective view of a clutch member for clutching the proof sheet carrier to the line space worm shaft;

Fig. 40 is a longitudinal section taken on the line 40—40 of Fig. 19, drawn to an enlarged scale, and illustrating the work clamping means and details of the clamp releasing means;

Fig. 41 is a perspective view of a movable clamping member forming part of the work clamping means;

Figs. 42 and 43 are perspective views, respectively, of a fixed clamping member, with which the movable clamping member cooperates;

Fig. 44 is a perspective view of a bracket associated with the fixed clamping member;

Fig. 45 is a perspective view of part of the tilting frame of the machine, means for automatically releasing the same, and parts of the carriage retracting mechanism, and work-notching mechanism;

Fig. 46 is a fragmentary view in side elevation illustrating the cooperative relation of parts of the means for automatically releasing the frame;

Fig. 47 is a transverse section taken on the line 47—47 of Fig. 45;

Fig. 48 is a perspective view of parts of the means for automatically releasing the frame, and the means for releasing the movable table from the line space mechanism;

Fig. 49 is a transverse section taken on the line 49—49 of Fig. 48;

Fig. 50 is a similar view taken on the line 50—50 of Fig. 48;

Fig. 51 is a longitudinal section taken on the line 51—51 of Fig. 50;

Fig. 52 is a fragmentary view, partly in section and partly in side elevation, of a frame latching means;

Fig. 53 is a detail view, partly in front elevation and partly in transverse section, illustrating the work-notching mechanism in normal position;

Fig. 54 is a similar view illustrating said notching mechanism in work-notching position.

Figure 55:
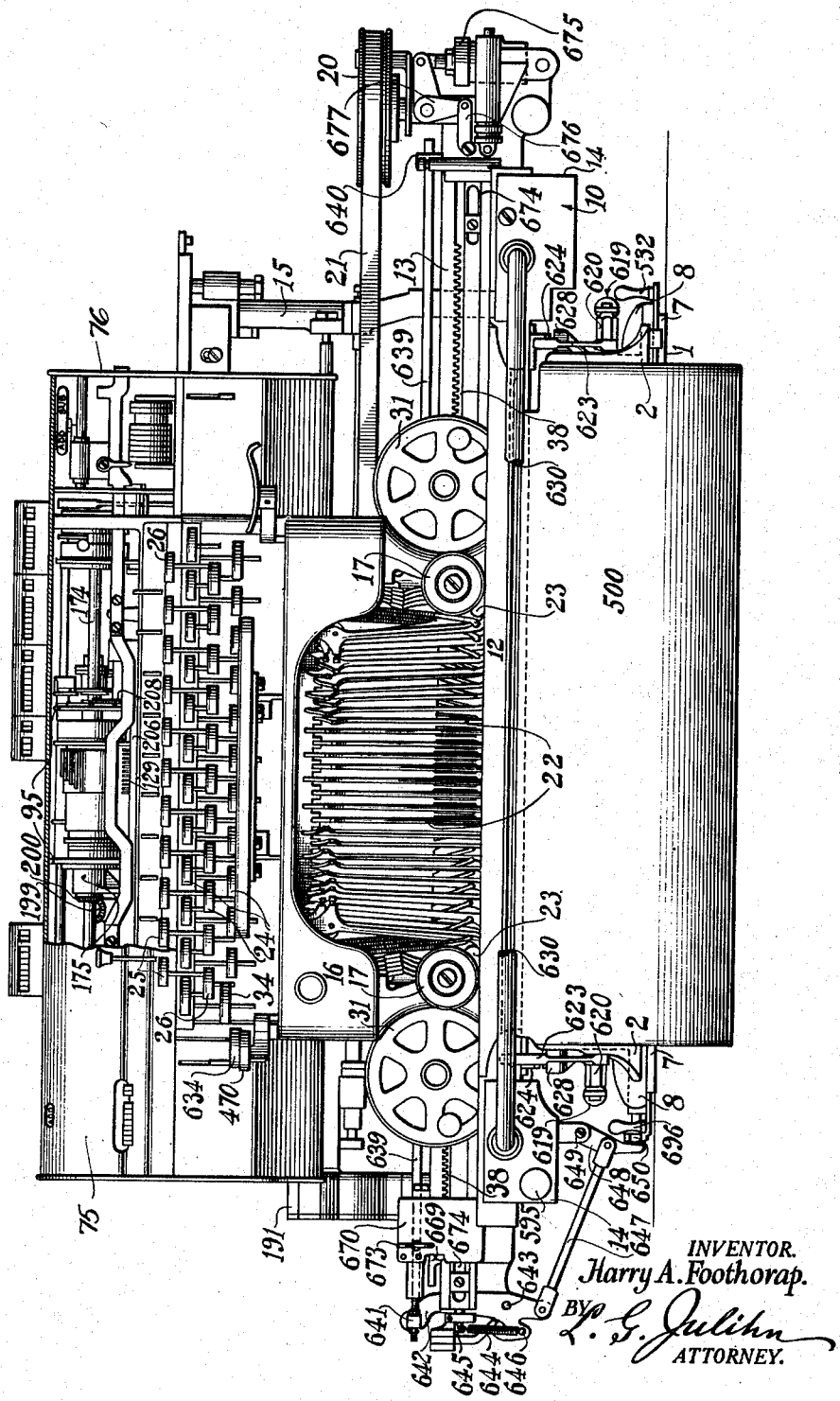
Figure 56:
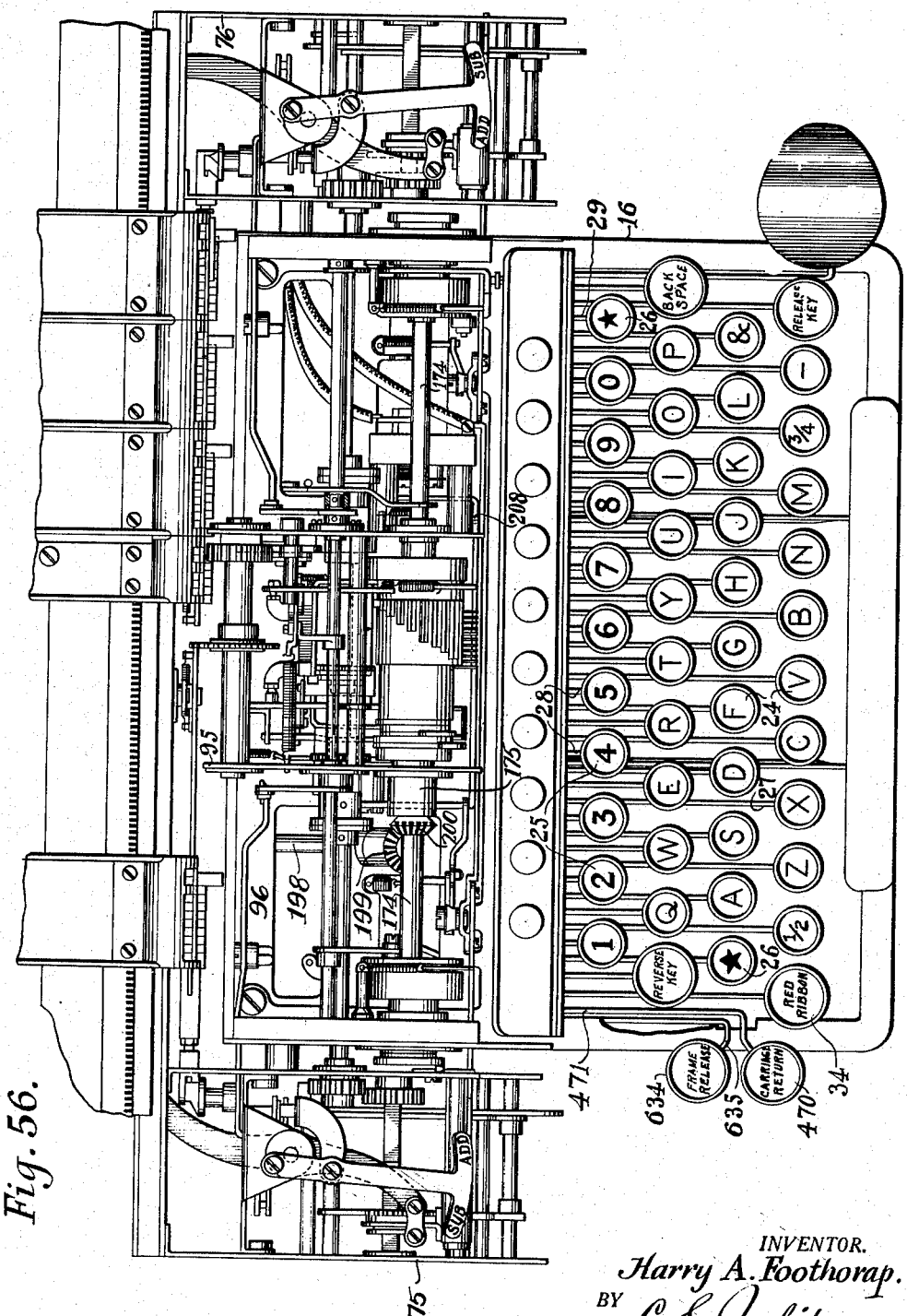
Figure 57:
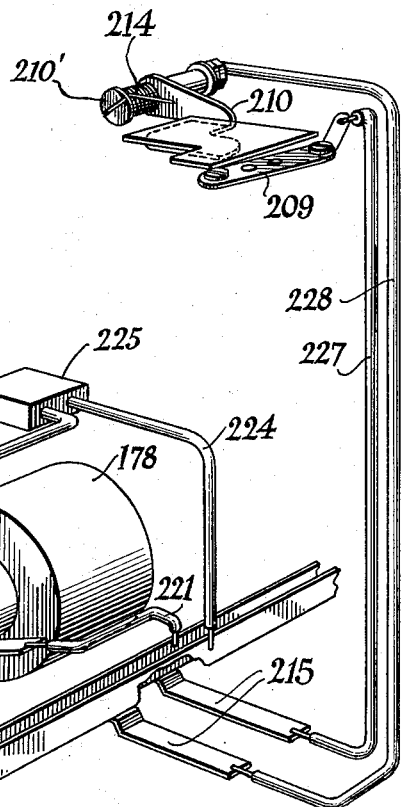
Figure 59:
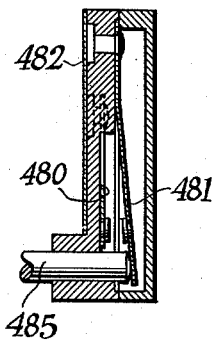
Figure 58:
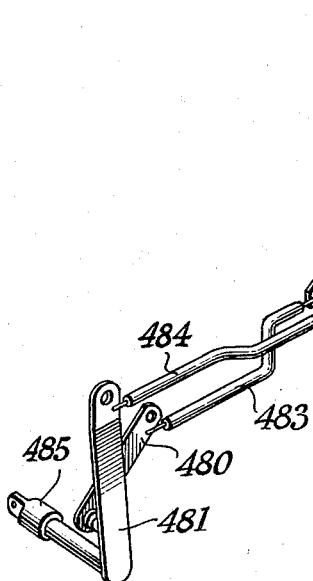

Fig. 55 is a view in front elevation of a complete machine, partly broken away to better illustrate the parts;

Fig. 56 is a top plan view of the same, with the casing removed;

Fig. 57 is a detail perspective view of a motor controlling mechanism;

Fig. 58 is a view in front elevation of a switch and switch box forming part of the motor control mechanism, Fig. 59 is a sectional view taken on line 59—59 of Fig. 58, and Fig. 60 is a detail side view of the lost motion linkage to release the work clamp.

For convenience in description, the various units of the machine in which the invention is incorporated, will be described under appropriate headings as follows:

Main supporting structure

Referring particularly to Figs. 1, 2, 4 and 55, the numeral 1 designates the base proper of the machine, including laterally spaced side bars 2 connected together by front, rear, and intermediate cross-bars 3, 4 and 5, respectively, and provided adjacent their rear ends with upstanding lobes 6. The side bars 2 are equipped with the usual resilient feet 7, secured in sockets 8, for cushioning the machine on a desk or table represented at 9.

Figure 4:
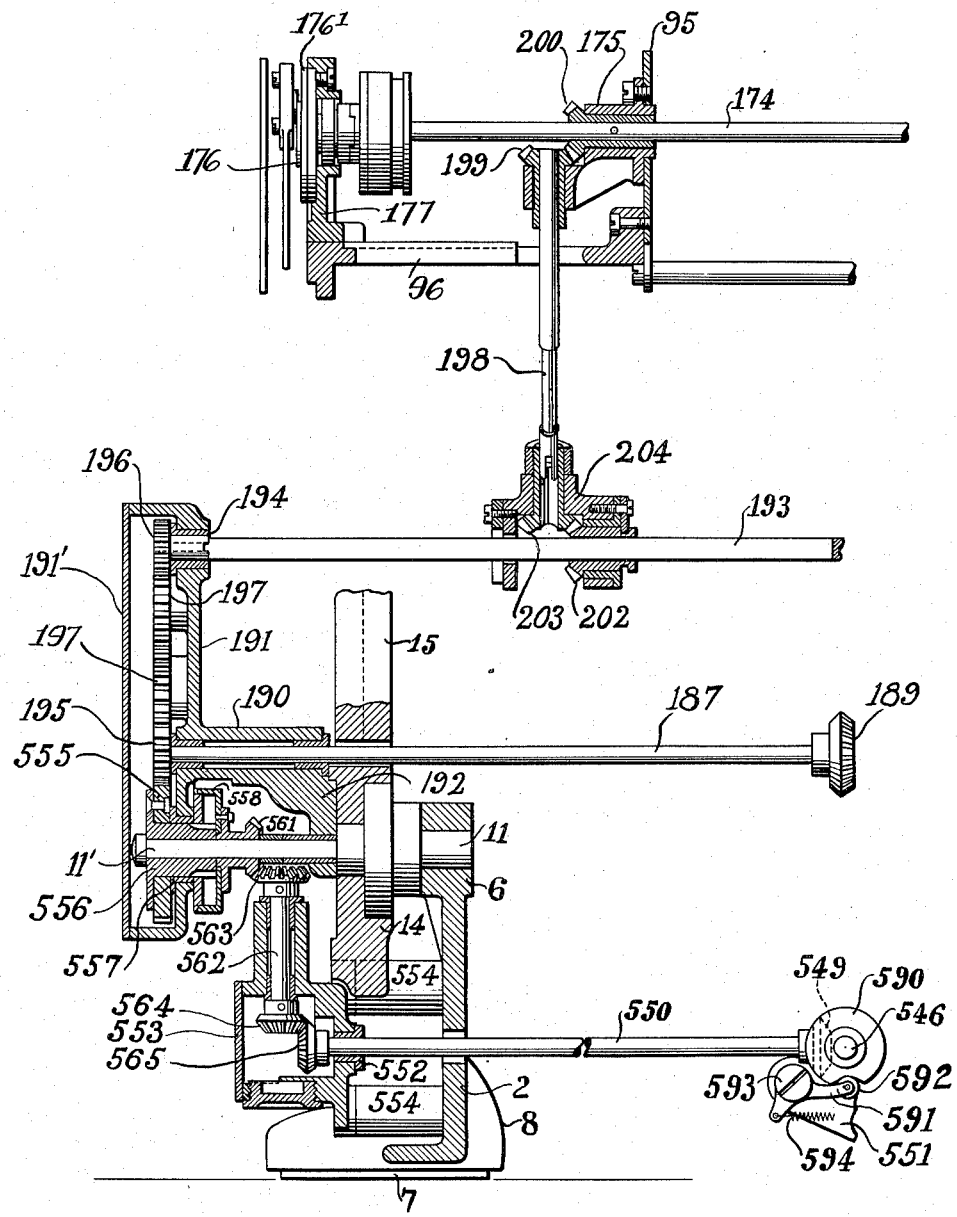
Fig. 4 is a detail sectional view taken on the line 4—4 of Fig. 3.
Figure 5:
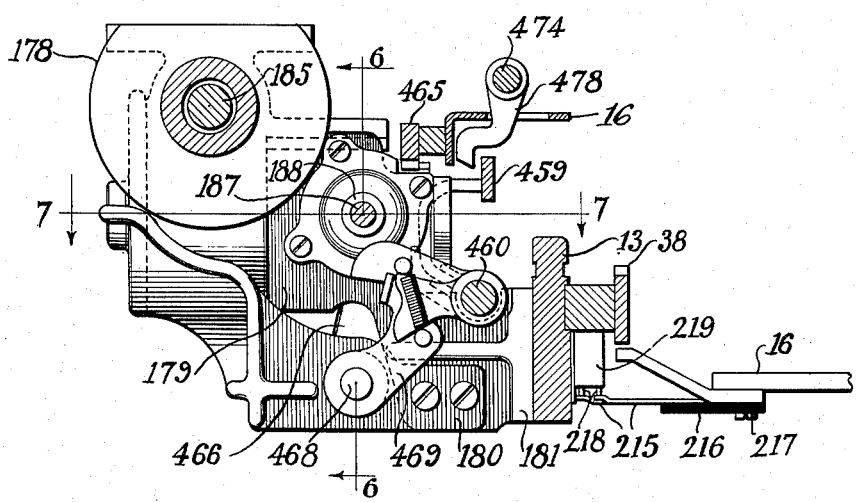
Fig. 5 is a view, partly in section and partly in elevation, of a motor and transmission mechanism forming part of said driving mechanism, together with parts of a carriage retracting mechanism operated by said motor, and controlling elements for the motor.
Figure 8:
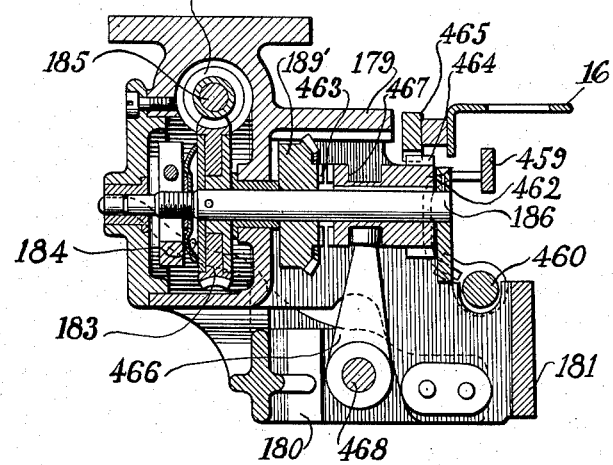
Fig. 8 is a sectional view taken on the line 8—8 of Fig. 6.

Surmounting the base 1 is an elevatory or tilting track frame 10 suspended between the lobes 6, as by horizontal trunnions 11, one of which is shown in detail in Fig. 4, for vertical swinging movement from a normally horizontal position slightly above the base 1. Included in the frame 10 are front and rear members in the form of track rails 12 and 13, respectively, extending transversely of the base 1, and side members 14 extending longitudinally of said base and terminating at their rear ends in upstanding brackets 15. The function of the tilting frame and its various parts will presently appear.

Recording or printing mechanism

The printing mechanism is of the usual Elliott-Fisher class disclosed, substantially, in my U. S. Patent No. 1,251,361, dated December 25th, 1917. Suffice it to explain that a carriage 16, is mounted by sets of front and rear rollers 17 and 18, on the rails 12 and 13 of the tilting frame 10 for advance and retraction in letter and contraletter feeding directions, respectively. A power barrel 20, (Fig. 55), mounted on the frame 10 and connected to the carriage 16 by a tape 21, advances said carriage. Mounted on the carriage 16 (see Figs. 1, 2, 55 and 56 particularly), are down strike type bars 22 operated through connections 23, by letter keys 24, value keys 25, and clear signal keys 26, fixed on key levers 27, 28 and 29, respectively, fulcrumed in the carriage 16 on a rod 30 (Fig. 3) and tensioned by springs 27'. As is well known, the function of a clear signal key 26 in the Elliott-Fisher machine is to print a signal, such as a star, in connection with clearing operations in a crossfooter register, as for instance, in my U. S. Patent No. 1,505,384, dated August 19, 1924. The machine of my present invention embodies two crossfooter registers, presently described, and hence two such clear signal keys 26.

At this point, it may be stated that the machine illustrated is designed for use, preferably, in computing according to the decimal system. It is, therefore, disclosed with a bank of value keys 25 ranging from "1" to "9" followed by "0" and, as is usual in these machines, with one clear signal printing key 26 included in said bank and following the "0" key thereof. It is contemplated, however, that the machine be adaptable for computing English currency. Insofar as the printing mechanism is concerned, such adaptation may be effected by substituting, in the place of the "0" and clear signal keys of the value key bank, keys bearing the values "10" and "11", respectively, and substituting appropriate type bars for those with which the "0" and clear signal keys were related. In this event, as will be understood, the "0" key of the letter key group is used in the printing of a zero.

The machine is equipped with the usual well known ribbon mechanism, including ribbon spools 31, shafts 32, (Figs. 1 and 2), brackets 33, and a color controlling ribbon shift key 34.

Main drive mechanism to general operator shaft

Referring particularly to Figs. 1 to 8, an electric motor 178, and transmission casing 179, are secured, as by brackets 180 and 181, to the rear face of the rear rail 13 of the tilting frame 10. A worm 182, Fig. 8, worm gear 183, and safety slip clutch 184, connect the armature shaft 185 of said motor in driving relation with a short transmission shaft 186 journaled in the casing 179 longitudinally of the machine. At the rear of the frame 10, preferably above the trunnions 11, (see Figs. 2 and 4), is a transversely extending main drive shaft 187. The latter has a bearing at one end, as at 188, Figs. 5–7, in the casing 179 for driven connection with the transmission shaft 186, as by beveled gears 189 and 189' fast on said shafts, respectively, the opposite end of the main drive shaft 187 extending through one bracket 15, (Fig. 4), and through a bearing sleeve 190 into a gear housing 191. The bearing sleeve 190 may be formed in a bracket 192 secured to the outer face of the left hand vertical bracket 15. The gear housing 191 is formed integrally with the sleeve 190 and bracket 192, and is closed by a cover plate 191', the bracket 15 and gear housing adapted to rock with the tilting frame 10. Above the main drive shaft 187 is a transversely extending squared spline shaft 193, (Figs. 2, 3 and 4), having a bearing (not shown) at one end in one of the brackets 15 and extending at its opposite end into the housing 191 through a bearing 194 therein. The main drive shaft 187 drives the shaft 193 in the proper direction by a gear train within the housing 191, including gears 195 and 196 fast on said shafts, respectively, and intermediate idler gears 197 in the housing. A general operator shaft 174, (Figs. 4 and 56), for actuating the accumulating mechanisms, extends across the carriage 16, through bushing members 175 on the brackets 95, (Fig. 4), with its ends terminating adjacent the left and right crossfooters 75 and 76, (Figs. 1, 2, 55 and 56), mounted on the opposite sides of the carriage 16. At its opposite ends, the shaft 174 is journaled in rotatable sleeves 176, (Fig. 4), which are conveniently supported by anti-friction bearings 176' secured to brackets 177 arising from the carriage plate 96.

Intermediate the spline shaft 193 and the general operator shaft 174 is an inclined jack shaft 198, (Figs. 3 and 4) operatively connected at its upper end to the general operator shaft 174 by beveled gears 199 and 200 fast on said shafts, respectively, and journaled in the angular bushing member 175. The spline shaft 193 is operatively connected to the lower end of the jack shaft 198 by beveled gears 202 and 203 on said shafts, respectively, mounted in an angular bearing member 204 fixed to the carriage 16, as by a bracket, 205, (Figs. 2 and 3) and slidable along the spline shaft 193, so that said gears 202, 203, are moved lengthwise of the shaft 193 with the carriage 16.

It will be seen that the before-described main drive mechanism is mounted on the elevatory or tilting frame 10 and carriage 16 to swing with said frame and carriage about the axis of the trunnions 11. A particular advantage of this arrangement is that the parts of the said main drive are always maintained in driving relation in any position of the frame 10 and carriage 16, and at the same time, are adapted for driving relation with respect to drive mechanism on the base 1, as will more clearly appear in the succeeding description.

Carriage retracting mechanism

Figure 6:
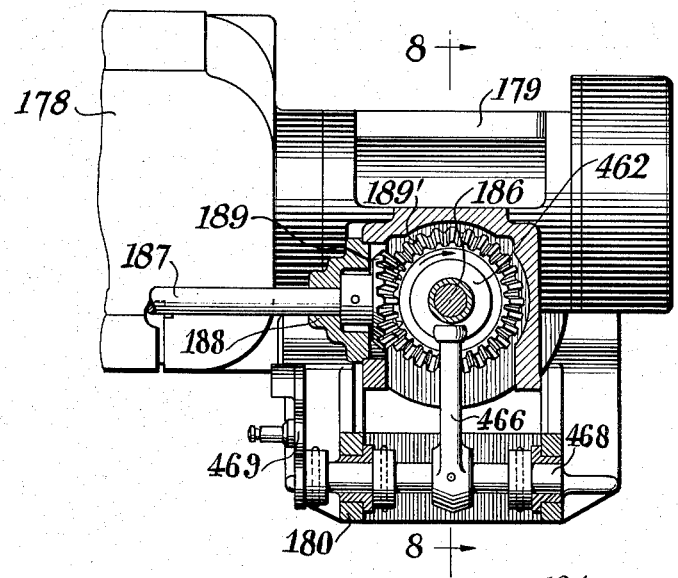
Fig. 6 is a sectional view taken on the line 6—6 of Fig. 5.
Figure 7:
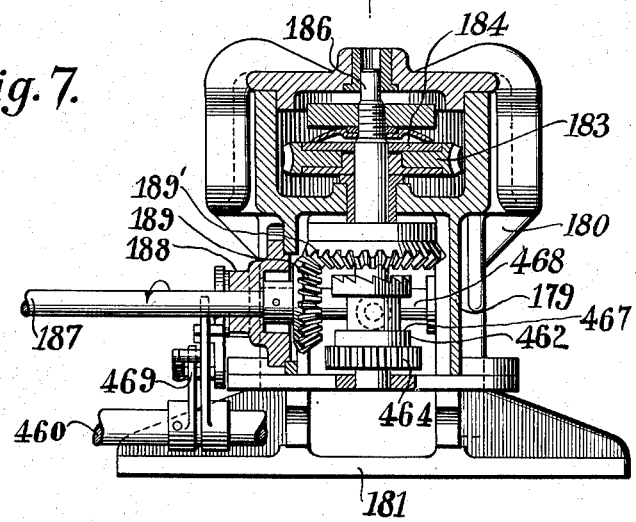
Fig. 7 is a sectional view taken on the line 7—7 of Fig. 5.

The carriage 16 is adapted to be retracted by mechanism disclosed substantially in my co-pending application, Serial No. 135,210, filed September 13th, 1926, now Patent No. 1,904,127, issued April 18th, 1933. Briefly, a transversely extending universal carriage retracting rock 459, (Figs. 1, 2, 5, 8, 9, 12, 16 and 17), is fast on a rock shaft 460 having its bearings in brackets 461 fast to the back of the rear rail 13 of the frame 10. Within the transmission casing 179, (Figs. 6 to 8), is a carriage retracting clutch, including a clutch sleeve 462 splined to and shiftable on the transmission shaft 186, and a clutch face 463 on the gear 189' which, it will be remembered, is driven by the motor 178. A wide pinion 464 on the sleeve 462 meshes at all times with a carriage retracting rack 465, (Figs. 1, 2 and 8), positioned rearwardly of, and fastened to the carriage 16. A clutch shifter 466, (Figs. 6 and 8) engaging a groove 467 in the clutch sleeve 462, is fast on a rock shaft 468 journaled in bushings in the parallel flanges of the bracket 180, (Fig. 6). Intermediate the shafts 460 and 468 are operating connections designated as a unit 469, (Figs. 2 and 5 to 7), whereby movement of the bail 459 in opposite directions will operate the shifter 466 to engage and disengage the carriage retracting clutch, respectively, the operating connections 469 functioning to yieldingly latch said clutch in engaged or disengaged condition, respectively.

The universal carriage retracting bail 459 may be rocked in the proper direction to engage the carriage return clutch in any position of said carriage, by a carriage "return" key 470, (Figs. 1, 2 and 45) carried by a key lever 471 pivoted on a fixed stud 472 to the left side frame of the carriage and tensioned against depression by a suitably connected spring 473. The operating connection between the key lever 471 and bail 459 comprises a rock shaft 474 mounted in bearings 475 on said carriage 16, a link 476 connecting said lever 471 with an arm 477 on the shaft 474, which shaft carries a bail operating finger 478. Rocking movement of said bail 459 in the opposite direction to disengage the carriage retracting clutch is effected automatically upon retraction of the carriage 16 to its left hand marginal position by a suitable tappet, (not shown) on the carriage adapted to contact a cam 479, (Fig. 12) adjustable along the bail 459, to time the disengagement of the carriage retracting clutch according to different marginal requirements.

A pair of stationary contacts 218, (Figs. 2, 5, 45, 47 and 57), mounted on the tilting frame 10 are adapted for continuous contacting relation with a pair of traveling contacts or brushes 215 mounted on and shiftable with the carriage 16 in any position of the carriage 16. The resilient brushes 215 extend from an insulation block 216, secured at 217, to the carriage 16. Each of these brushes lies in wiping engagement with the lower edge of one of a pair of bus-bars 218 embedded, in side by side parallel relation, in an insulating strip 219 secured to the front face of the rear rail 13 of the frame 10, as at 220. A wire 221, (Fig. 57), connects one bus-bar 218 to one side of the motor 178. Wires 223 and 224 connect the other side of said motor and the other bus-bar 218, respectively, with a plug socket 225 for receiving the usual power leads 226.

Figure 1:
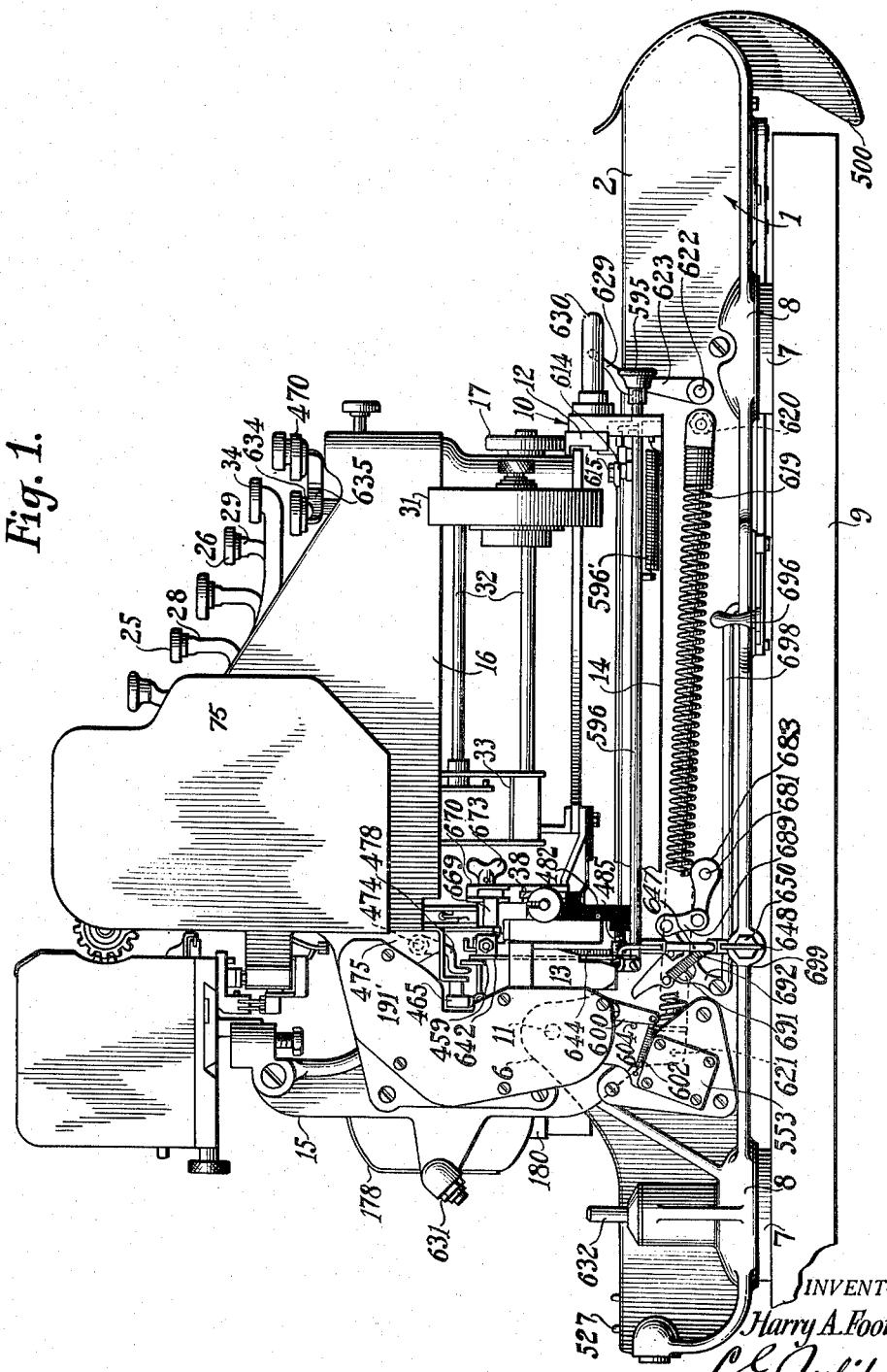
Figure 1 is a view in left side elevation of an Elliott-Fisher type of machine equipped according to my invention.

The motor 178 is energized, by operation of the carriage "return" key 470, simultaneously with the engagement of the carriage retracting clutch, through the medium of a switch, (Figs. 12 and 15 to 17), including fixed and movable contacts 480 and 481, respectively, mounted in a switch box 482, (Figs. 9 and 59), of insulation material, suitably secured to the tilting frame 10, (see Fig. 1). Wires 483 and 484 (Figs. 57–59) connect the contacts 480 and 481 to the conductors or bus-bars 218, respectively. The contact 481 is resilient and tends to engage the contact 480, but is normally disengaged therefrom by an insulated plunger 485, one end of which enters the switch box 482 to engage the spring contact 481, the opposite outer end of the plunger being connected to a depending switch control arm 486, (Figs. 9–12 and 15–17), loose on the rock shaft 460 for operation thereby. A suitably arranged spring 485' (Fig. 9) urges said arm and plunger in a direction to disengage said contact 481. A switch-controlling crank arm 487 fast on the shaft 460, is provided with a laterally extending lip 487' overlapping the loosely mounted switch control arm 486, and when the carriage retracting bail 459 is rocked in a direction to enable the engagement of the carriage retracting clutch, (Fig. 16), the arm 487 will pick up and move the arm 486 and plunger 485 against the tension of the spring 485' to withdraw the plunger from the spring contact 481, and permit the contact 481 to engage the contact 480 and complete the circuit through the motor 178. The carriage 16, upon its return to the beginning of a line, by contact with the cam 479, (Fig. 12), previously mentioned, rocks the bail 459 counter-clockwise from the position shown in Figs. 16 and 17, to the position shown in Figs. 12 and 15, thereby rocking the carriage return control shaft 460 in a similar direction to effect the disengagement of the carriage-return clutch 462, (Figs. 5 and 6), and to withdraw the switch control arm 487, (Figs. 12 and 15), and its lip 487' relatively to the loosely-mounted switch control arm 486, whereupon the spring 485, (Fig. 9), superior to the resilient action of the spring contact leaf 481, is free to rock the control arm 486, counter-clockwise and cause the plunger 485 to flex the contact leaf 481 away from its co-acting contact 480 to interrupt the flow of current to the motor through the carriage-return circuit.

Work collating and feeding means

Coming now to the work collating and feeding means with which the machine is equipped, a flat bar-like platen 488 (Figs. 2, 20 and 21) cushioned by a resilient strip 489, is mounted on the base 1, transversely thereof, and beneath the printing point of the machine, on the intermediate cross bar 5 of said base. The platen 488 and strip 489 are spaced at their ends from the side bars 2, (Fig. 53) for a purpose presently apparent, the platen and cushion therefor being secured to said bar 5 by sleeves and screws, as at 491 and 492, respectively. A protecting and cushioning sheet 493, preferably of rubberized fabric, is stretched taut across the upper edge of the platen 488, on the one hand, by springs 494 connecting the rear edge of the cushioning sheet to a fixed anchor bar 495, and on the other hand, by notched stretcher hooks 496 along the front edge of the sheet hooking over pins 497 on the front cross bar 3 of the base 1. The sheet 489 inclines downwardly from the front and rear of the platen 488 for a purpose which will presently be seen.

In front of the platen 488 is a horizontal, stationary, work supporting table 490 fixed by screws 498, (Fig. 19), to subjacent brackets 499, (Figs. 2 and 20–22), projecting from the side bars 2 and from the front cross bar 3, respectively, of the base 1. A curvilinear guard 500 is fixed at 501 to the side bars 2 in front of said table 490.

In the rear of the platen 488 is a table 502 mounted for movement in a line spacing direction on subjacent tracks 503, (Figs. 2, 19, 21 and 31) by means of grooved rollers 504 and roller supporting brackets 505 depending from said line-spacing table. The tracks 503 may be supported at their rear ends on the upper ends of vertical posts 503ª, (Figs. 19 and 21), projecting upwardly from the cross rail 4, and suspended at their forward ends by the depending brackets 503', (Figs. 19, 21, and 30), projecting from the frame side bars 2. Motor springs 506, (Figs. 2, 19, and 20), having their opposite ends connected to the line-spacing table 502 and to the cross bar 5, as at 507 and 508, respectively, tension said table against rearward movement in line spacing direction and act to return it to normal position with its front edge contiguous to the platen 488.

Work clamping means

At the left hand side of the movable table 502, (Figs. 19, 25 to 28 and 40 to 44) is means for clamping a bill, or other work sheet, (not shown) including a clamping member 509 pivoted at its rear end 510 to the adjacent side frame bar 2 for vertical clamping and releasing movement. The member 509 is flanged inwardly along the forward portion of its upper edge to provide a sheet-engaging lip 511 overlapping and adapted for clamping cooperation with the left edge of the line spacing table 502, the flange being extended forwardly past the left-hand end of the platen bar which was shortened to afford clearance therefor, and beyond the forward end of the clamping bar 509, as at 512, for sliding engagement with a grooved clamping member support 512', (see Figs. 40, 42 and 43), fastened at 513, (Figs. 19 and 23), to the under face of the line spacing table 502 and extending forwardly beyond the front edge of said table and platen 488. The forwardly projecting end of the clamping member support 512' is accommodated in a slot 514 in the rear edge of the stationary work table 490. To clamp the bill or other work sheet at both the rear and front of the platen 488, I may provide gripping teeth 515 for yieldingly engaging the work sheet. These gripping teeth are seated in apertures 515', (Fig. 25), formed in the flange 511 of the clamping member 509, overlying the edge of the line spacing table 502, and are held in effective position by the leaf springs 517, (see Figs. 19 and 23), secured to said flange at 518. The clamping member 509 is yieldingly held in clamping position by a spring 519, (Figs. 24, 26 and 40), secured to a stud 520 on the clamping member, and to a bracket 521 detachably mounted, for convenience in assembly, on a lug 522 on the clamping member support 512'. A slotted guide 523, (Figs. 24, 26 and 43), on the clamping member support 512' embraces the forward end of the clamping member 509 to prevent its lateral displacement. Cooperating keeper lugs 524 and 525, (Figs. 21, 24 and 40) are provided on the clamp supporting member 512' and the platen cross bar 5, respectively, to hold said member rigid, in the normal position of the line spacing table 502. Cooperating stops 524' and 525', (Figs. 19 and 20) on the line-spacing table 502 and rear bar 4 of the base, respectively, arrest forward movement of said table in the normal position of the latter.

Carbon clamping means

Secured by side brackets 526 to the rear of the movable table 502, (Figs. 2, 19, 21, 23 to 28, and 40 to 44), are cooperating fixed and movable carbon clamping bars 527 and 528, respectively, the latter pivoted to the side brackets 526, as shown in dotted lines, at 529, and tensioned by springs 530 to engage the former, whereby a carbon sheet may be clamped to the rear of the line-spacing table 502 with its front portion free and extending forwardly for easy manipulation by the operator. Beneath the line spacing table 502 a carbon reel 531, (Figs. 2 and 19) is suitably journaled, preferably in the side bars 2, and upon which a roll of carbon paper (not shown) may be mounted to be fed between said clamping bars as desired.

In the normal "loading" position of the movable table 502, the clamping bar 528 is movable to releasing position by operation of a carbon releasing lever 532, (Figs. 19, 36 and 37). The latter is pivoted, as at 533, on the right hand side bar 2 of the base 1 to be conveniently grasped by the operator, and is operatively connected, (Figs. 2 and 20), to said clamping bar 528 by a rod 534, and a bell crank 535, the latter pivoted to the adjacent side bar 2, as at 536, to overlie a projecting stud on a crank arm 537 fast with the clamping bar 528, whereby the arm 537 is operative by the bell crank, but is free to move rearwardly with the table 502. A gravity latch 538 is pivoted at 539, (Fig. 37), on the side bar 2 to retain the carbon releasing lever 532 in position to hold the carbon clamping bar 528 released.

Proof sheet carrier

Extending along the right hand edges of the tables 490 and 502 between such edges and the adjacent side bar 2, is a proof sheet carrier 540, (Figs. 19, 22 and 35 to 39), in the form of a slide mounted for fore and aft movement, in line spacing direction on laterally spaced tracks 541, one projecting from the adjacent side bar 2, and the other secured near its forward end to the aforesaid bracket 499, (see Figs. 2, 20 and 37), and near its rear end to the rear bar 4. The tracks 541 are below the level of said tables and the upper edge of the right hand side bar 2, and a sufficient space is provided between the right-hand edges of the tables and said side bar 2 so that said carrier 540 is guided in its movement by said tables and bar. The usual studs 542 are provided on the proof carrier 540 for attaching a proof or other work sheet having a perforated margin. A sheet retaining bail member 543 is pivoted in lugs 544 on said carrier 540 and tensioned by springs 545, (Figs. 19 and 38), to clamp the marginal edge of the proof or like sheet to the carrier.

Line space mechanism

The movable table 502 and the proof sheet carrier 540 are adapted to be moved simultaneously, step by step in line spacing direction by the motor 178 and mechanism driven thereby as follows: A line space worm shaft 546, (Figs. 2, 4, 19, 20, 22, 29, 30, 32 and 35 to 37), is mounted at the right hand side of the machine, below and parallel with the proof sheet carrier 540, to extend longitudinally of the base 1, in bearing brackets 547 projecting from the inner face of the right hand side bar 2. The line space worm shaft 546 is connected near its rear end by beveled gears 548 and 549, respectively, (Figs. 2 and 20), to a line space drive shaft 550 journaled adjacent one end in a suitably secured bearing bracket 551 on the rear cross brace 4, and having its other end projecting through an opening in the opposite frame side bar 2, (Fig. 4), and through a bushing 552 into a gear housing 553 secured at 554, (Figs. 4, 10 and 11), to the left hand side bar 2 subjacent the spindle 11' constituting the reduced and outwardly extended end of the left hand trunnion 11.

The line space drive shaft 550 is driven through the main drive shaft 187 which is connected in constant driving relation with said shaft 550, irrespective of the relative positions of the frame and table, as follows: Within the gear housing 191, (Figs. 3 and 4), and meshing with the gear 196 on the main drive shaft 187 is a gear 555 fastened to a circular flange on the outer end of a toothed clutch sleeve 556 freely rotatable on the spindle 11' and projecting outside the housing through a bearing sleeve 557 in the latter. The clutch sleeve 556 forms the driving element of a single revolution line space clutch, (Figs. 4, and 9 to 17), the driven element of which includes a clutch housing 558, inclosing a clutch dog 559 and a spring 560, and a beveled gear 561 fast on the clutch housing 558. Journaled in the gear housing 553 is a line space jack shaft 562, (Figs. 3 and 4), having fast on its opposite ends, beveled gears 563 and 564, respectively, one meshing with the gear 561 and the other meshing with a similar gear 565 fast on the line space drive shaft 550.

Associated with the movable table 502 is means for clutching said table to the line space worm shaft 546 to be fed thereby, such means including a vertically rocking clutch control bail 566, (Figs. 2, 20 and 29 to 32), pivoted at 567 to the opposite ends of one of the brackets 505 depending from the under face of said table, and having a follower arm 568 adapted, upon rocking movement of the bail, to engage and release said worm shaft, respectively. A spring 569 connected to said clutch bail and to an extension 570 of said bracket 505, as at 571 and 572, yieldingly retains said bail with its follower 568 engaged with the worm 546.

Secured at 573 to a depending extension corresponding to the extension 570 at the opposite end of the aforesaid bracket 505, is a stationary latch carrier 574, the body portion of which is formed with a slotted offset 574ᵃ, the parallel walls of the slot terminating at their lower ends in eyes 574ᵇ. A latch 575 is guided in this hollow offset, the latch being pivoted to the eyes 574ᵇ at 576, to snap over the follower arm 568 of the clutch control bail 566 under the urge of a suitably arranged spring 575ᵃ, when said bail is in its release position, and retain the bail 566 in such position. A slotted guide and stop arm 577 lying over the follower arm 568, extends from said carrier 574 and limits downward movement of the clutch control bail 566 under the urge of the spring 569.

In the normal or starting position of the table 502, the latch 575 is rendered ineffective by a latch-releasing finger 578 engaging a lug 579 on the latch 575, the finger being slidably mounted on the inner face of a flange 580ᵃ struck up intermediate the ends of a bracket 580 extending inwardly from the right hand side bar 2, the finger being held in place by screws 581 passing through slots 582 in the finger for adjustment to accurately time the release of the latch 575 to coincide with the return of the line spacing table 502 to normal position.

Depending from the proof sheet carrier 540, (Figs. 35 to 39) is a vertical guide flange 583 adapted to travel in the space between the tracks 541, and terminating in a smooth bored guide sleeve 584 encircling and sliding on the line space worm shaft 546. Pivoted intermediate its ends on the guide flange 583 at 585 is a vertically rocking dog 586 having a follower portion 587 adapted, upon movement of the dog 586 in opposite directions, to engage and to release said worm shaft 546, respectively. A spring 588 retains the dog 586 in such position that the follower engages the worm. A finger piece 589 on the tail of said dog projects upwardly through a slot in the proof sheet carrier 540 to a point above the carrier to enable the dog to impart step by step, rearward movement to the carrier, as hereinafter explained, and to enable the operator to manually release the proof sheet carrier 540 from said worm shaft 546 and shift said slide to vary the relation of the proof sheet to the bill sheet, as desired, and then clutch said slide to said shaft for line space movement with the line-spacing table 502.

To accurately locate the movable table 502 and the proof sheet carrier 540 in line position, a notched disc 590 (Figs. 4 and 20), is fast on the line space worm shaft 546 and a locator dog 591 carrying a roller 592 is pivoted at 593 to the stationary flange 551 for movement by a spring 594 to engage said disc.

The means for controlling line spacing

Positioned at the left hand side of the machine (Figs. 1, and 11 to 17) is a manually and automatically operative control means for initiating a line space operation, including a line space key 595 located in front of the tilting frame 10 on the forward end of a rearwardly extending push rod 596 mounted to slide on one side member 14 of said frame 10 against the tension of a suitably arranged spring 596', (Figs. 1 and 16).

The push rod 596 is operatively connected at its rear end, as at 597, to a clutch control arm 598 freely mounted on the rock shaft 460 contiguous to the before-described electric switch control arm 486. It will be remembered that the switch control arm 486 and plunger 485 are operative to control the circuit to energize the motor 178 independently of the carriage retracting bail 459. The clutch control arm 598 is designed, upon rearward movement of the line space key 595, to impart such independent operation to the switch control arm 486 and plunger 485, and at the same time, effect engagement of the clutch dog 559 with the toothed clutch sleeve 556 of the line space clutch. To this end, said arm 598 is provided with a laterally projecting lug 599, (Fig. 11), overlapping the switch control arm 486 to pick up the latter and move it in the proper direction, the lug 599 forming such a connection between these two elements as will enable the operation of the switch control arm 486 by the carriage retracting bail 459 without affecting the clutch control dog 559.

Associated with the line space clutch is a multiple-armed clutch trip member 600, (Figs. 9, 11, 12, and 15 to 17), rocking on a fixed stud 601 on the gear casing 553 of the base, a rearwardly extending, hooked arm of which trip member is shiftable into engaging and disengaging positions, respectively, relatively to the clutch dog 559, in the latter of which positions, the clutch dog 559 is disengaged from the toothed clutch sleeve 556, as will be clear from Figs. 9 and 16. A spring 602 connected to a depending arm of the trip member 600 and to a fixed stud 603, yieldingly retains said trip member in normal clutch-disengaging position against a stop 604.

An angular trip dog 605, the rearwardly extending arm of which carries a laterally projecting boss 606, is pivoted at its elbow, as at 607, to the clutch control arm 598, and in its normal position, its rearwardly extending arm engages said boss with a laterally formed lip 608 on an upwardly projecting arm of the trip member 600, whereby, when said arm 598 is operated by the line space key 595, the trip member 600 will be rocked in opposition to the spring 602 to cause its rearwardly projecting hooked arm to release the clutch dog 559 for actuation to its clutch-engaging position, (Figs. 12, 15, and 17). A spring 609 connecting the angular trip dog 605 to an ear 610 on the clutch control arm 598, urges the upturned tail of said dog into normal position against a stop 611 on said arm. A pin 612 on the rotatable housing 558 contacts the trip dog 605 shortly after the commencement of rotation of the housing, to shift the dog to a position in which the boss 606 frees the trip member 600 for return by its spring 602 to normal position to disengage the dog 559 from said clutch ratchet 556 at the end of a single revolution.

Carriage controlled line spacing

The before described line space control mechanism is automatically operative by retraction of the carriage 16. For this purpose, the carriage 16 is provided with a lug 613, (Figs. 9 and 10), adapted, when said carriage is retracted to its extreme left hand position, to engage and cam the beveled end of a line space lever 614 pivoted, as at 615, on the tilting frame 10 and operatively connected to the push rod 596 to rock the lever 614 clockwise, (Fig. 10), and shift the push rod 596 rearwardly, thereby automatically effecting the operations previously described as a consequence of the manual movement of said rod. To permit operation of the line space key 595 in the event that the line space lever 614 becomes jammed, a yielding connection between said lever and the push rod 596 is provided, comprising a slot 616 in the former, a stud 617 on the latter, and a spring 618 suitably connecting said lever and rod.

Frame tilting and latching means

The tilting frame 10 is constantly urged upwardly, about the trunnions 11, by a pair of frame tilting motor springs 619, (Fig. 1), located at opposite sides of the base 1, respectively, and each having its forward end secured to the adjacent side bar 2 by a stud 620 and its rear end secured to a lug 621 depending from the frame 10 at a point some distance below the pintle 11 on which the frame 10 is pivoted, as shown in dotted lines in Fig. 1. A transversely extending rock shaft 622 is journaled in the side bars 2 near their forward ends, the rock shaft having fast on its opposite ends a pair of hooked frame latches 623, respectively, (Figs. 1, 19, 22, 48 and 52), adapted to be rocked into latching and unlatching positions by rocking movement of the shaft in opposite directions, respectively, and hooking, in their latching position, over a pair of keeper plates 624 projecting from the front rail 12 of the frame 10 to latch the frame against tilting movement upwardly from its normal position. A spring 625, (Fig. 50), suitably connected to the transverse frame bar 3 and to a depending crank arm 626 fast on shaft 622, urges the latter in a direction to normally retain the latches 623 in frame-latching position. Stop screws 627, (Fig. 52), vertically adjustable on the rail 12 of the frame 10, contact cushioned stop lugs 628 on the side bars 2 of the base 1 to establish the normal position of the tilting frame 10. One of the latches 623 is provided with an extended finger portion 629 for manually releasing said latches. A hand rail 630, (Figs. 1 and 2), is secured to the front rail 12 of the tilting frame 10 for convenient manipulation of the frame by the operator. Cooperating rear stops 631 and 632 on the tilting, upright brackets 15 and side bars 2, respectively, limit upward tilting movement of the frame 10. The usual depressor plate 633, (Fig. 2), may be secured in any suitable manner to the front rail 12 of the frame 10.

Means for automatically releasing tilting frame

Means are provided for automatically unlatching the tilting frame 10 to release the same by retraction of the carriage 16, and also under the control of a "Frame release" key, 634 (Figs. 1, 2, and 45), mounted on a key lever 635. Referring now particularly to Figs. 45 to 48, the key lever 635 is pivoted on the carriage 16 alongside the lever 471 of the "Carriage return" key 470, on the pivot stud 472 of the latter. A stud 636 on said lever 635 enters a slot 637 in the lever 470 to connect said levers together so that the "Frame release" key 634 operates the "Carriage return" key 470 to effect retraction of the carriage, whereas the "Carriage return" key 470 is independently operative. A suitably arranged spring 638 tensions the "Frame release" key lever 635.

Adjacent and parallel with the rear track rail 13 of the tilting frame is a transversely extending tilting frame release rod 639 endwise movable in an eye 640 (Fig. 55) projecting upwardly from the right hand end of the rear track rail, and operatively connected at its left hand end, as at 641, (Figs. 45 and 46), to the upper end of a lever 642 rocking on a stud 643 on said rail 13. A spring 644 connected to a bracket extension on the rail 13, as at 645, (Fig. 55), and to the lever 642, as at 646, tensions the tilting frame release rod 639 against movement in the direction of retraction of the carriage 16. A link 647 connects the lower end of the lever 642 to a depending lever 648 pivoted on the frame 10, as at 649, and operatively related, in the normal position of said frame 10, to a push rod 650, (Fig. 48), projecting outwardly from, and sliding in the base 1, to press the rod 650 inwardly when the tilting frame release rod 639 is moved in the direction of retraction of the carriage 16. The push rod 650 is connected by a crank 651 to the rear end of a shaft 652, (see also Figs. 21 and 22), extending forwardly, and mounted in bearings 653 on the inner face of the adjacent side rail 2, to be rocked in one direction by said push rod 650 against the tension of a spring 654. Rocking movement of the shaft 652 in clockwise direction, (Fig. 22), rocks the shaft 622 in a direction to move the latches 623 to unlatching position through the medium of a sleeve 655 loose on the shaft 622, cooperating crank arms 656 and 657 fast on said sleeve and the shaft 652, respectively, and a stud 658 on the arm 656 engaging the crank arm 626 on the shaft 622. The stud 658 is so related to the crank arm 626 that the shaft 622 may be independently rocked to manually release the tilting frame 10, as previously described. A suitably attached spring 658' tensions the sleeve 655 against movement by the shaft 652 and restores the sleeve to its normal position.

The tilting frame release rod 639 is moved in the direction of retraction of the carriage 16, as follows: Pivoted to a hanger on the carriage 16, as at 659, (Figs. 45 to 47, 53 and 54), is a coupling dog 660 adapted to be rocked into effective and ineffective positions, respectively, relatively to a coupling block 661 adjustably mounted on the tilting frame release rod 639, and in its effective position, contacting said block during retraction of the carriage, to couple said release rod 639 to said carriage 16 for movement therewith. A latch 662 is pivoted to the hanger on the carriage 16, as at 663, for cooperation with shoulders 664 and 665, respectively, on said dog 660, and is connected to the latter by a spring 666, to yieldingly latch the dog 660 in either of its two positions and to enable said latch to rock said dog to effective position. A draw rod 667 connected at its lower end to the dog, has its upper offset end loosely entered in a slot 668 in the "Frame release" key lever 635 to enable the aforesaid operation of the latch and permit the return of the lever 635 under the influence of its spring 638 while the dog 660 remains latched in effective position.

The coupling dog 660 is automatically returned to ineffective position to uncouple the frame release rod 639 from the carriage 16 when the latter has been fully retracted, by a cam shoe 669 on the adjustable left hand margin stop 670 of the machine, which is wiped by a pin 671 on said dog as the carriage completes its retracting travel. When said tilting frame release rod 639 has been thus uncoupled, the springs 664, (Figs. 45 and 55), 654, (Fig. 48), and 625 (Fig. 50), will return to normal positions the before-described parts which have been operated by said rod.

As is usual in this type of machine, the margin stop 670, (Figs. 1, 45 and 47), is mounted on the carriage feed rack 38 and may be set to different positions to vary the extent of retraction of the carriage 16 according to different marginal requirements, by a detent means 672 operative by the thumb screw 673 to interlock with the teeth on said rack. As featured in my co-pending application, Serial No. 570,568, filed October 23rd, 1931, now U. S. Letters Patent No. 1,992,940, February 5, 1935, the feed rack 38, in the present instance, may be slotted at 674 for limited endwise movement, and connected to a dash pot 675, (Fig. 55) for shock absorbing purposes, by the link 676 and intermediate connections designated as a whole 677.

The tilting frame release rod 639 is toothed, as at 678, (Figs. 45–47), and the coupling block 661 is equipped with a detent dog 679 urged by a spring 680 to interlock with said teeth, whereby said block may be set in proper relation to the margin stop 670 to effect automatic release of the tilting frame 10 and subsequent uncoupling of the release rod 639, by retraction of the carriage 16 to different marginal positions.

Means for releasing work clamping means

Associated with the before-described work clamping member 509, (Figs. 23–28 and 40–44), is means for moving said member to releasing position to release the work sheet either automatically or manually as desired, and in any position of the table 502. Preferably a clamp-releasing shaft 681, (Figs. 1, 23, 24, 28 and 40), having fast thereon oppositely disposed operating and clamp-releasing arms 682 and 683, respectively, is journaled in and projects through the base side bar 2 adjacent to and beneath the clamping member 509 to lift said member 509 to a release position by means of a roller 684 on said arm 682 engaging a longitudinally extending lateral flange 685 on the lower edge of the vertical web of said work clamping member, the flange 685 being of the requisite length for engagement by said roller in any position of the table 502. The shaft 681 and arms 682 and 683 are held in normal position, with the roller 684 engaging said flange, by a stop lug 686 on the arm 683 which rests upon a stop pin 687 projecting from said side bar 2, a suitably arranged spring 688 tensioning said shaft 681 and arms against operation in a direction to lift said member 502. Connected by a link 689 to the outer arm 683, (Figs. 1, 40 and 60) of the shaft 681 is a shaft-operating rocker 690 pivoted on a stud 691 on the side bar 2.

A rocker-operating lever 692 also pivoted on the stud 691, has a lost motion connection with said rocker 690 through shoulders 693 on said lever and a pin 694 on said rocker, whereby the lever 692 may be set in either of two positions, in one of which it is effective to pick up the rocker 690 and rock the shaft 681 to lift the work clamping member 509 against the tension of the spring 519, (Figs. 26 and 40). As shown in full and in dotted lines in Fig. 40, the upper end of the lever 692 is located in the path of a lug 695 on the tilting frame 10, whereby, when the frame is tilted, the lever 692 is automatically operated to cause its upper shoulder 693 to strike the pin 694 on the rocker 690, and operate the linkage connecting the rocker and the shaft 681, to lift said clamping member 590 and release the work. In the other set position of said lever 692, as shown in fainter dot and dash lines in Fig. 40, the lug 695 passes idly thereover and the tilting frame 10 is ineffective to release the work. A hand lever 696, (see also Fig. 19), is pivoted at 697 on the frame bar 2 and connected to said lever 692 by a rod 698, whereby the lever 692 may be set into either of its two positions. A spring 699 connected to studs 700 and 701 on the rocker 690 and lever 692, respectively, yieldingly retains the latter in either of its set positions. Obviously, the work may be manually released by operation of the hand lever 696 when the tilting frame 10 is in normal position, or partly tilted, or in any position where the lug 695 does not interfere with such operation.

Means for automatically releasing the movable table from the line space mechanism It will be seen that when the carriage 16 has been retracted to automatically unlatch and release the tilting frame 10, the work sheet or sheets may be released as a result of subsequent tilting of the frame 10, and as determined by the position of the hand lever 696.

Simultaneously with the automatic release of the tilting frame 10, and hence just prior to the automatic release of the work-clamping member 509, 511, and the work sheet, the movable table 502 is disengaged from the line space worm shaft 546 for return by its motor springs 506, (Fig. 19). Preferably, this operation is accomplished by disengaging the clutch bail 566, (Figs. 20, 29, 30, 32 and 48), from the line space worm shaft 546, through the medium of a bell crank lever 702 pivoted at 703, (Fig. 29), to the upturned inner end of the bracket 580, a grooved roller 704 on one arm of the bell crank lever engaging said bail, and a link 705 connecting the remaining arm of said lever to a crank 706 (Fig. 48) fast on the sleeve 655, whereby when the sleeve is rocked to release the latches 623, said bail 566 is rocked against the urge of its spring 569 to disengage the follower 568 from said worm shaft 546. A stop screw 707 on the arm 706 engaging a suitable part of the base 1 establishes the normal position of the lever 702, link 705 and sleeve 655. The bail 566 is of sufficient length to maintain contact with the roll 704 in any of the positions to which the line spacing table 502 may be fed.

Work notching mechanism

The machine is equipped with work notching mechanism for forming a notch in a marginal edge of the work sheet in line with the last line of printing thereon.

The work notching mechanism (Figs. 19, 45, 46, 53 and 54) includes a notching shaft 708 mounted to rock in bearing brackets 709, on one side bar 2 of the base 1, alongside the left hand edge of the movable table 502, the shaft having fast thereon in line with the printing line of the machine, a notching blade 710 overhanging, in the normal position of the mechanism, the left hand marginal edge of the work sheet. Cooperating with the notching blade 710 is a notching die member 711 projecting from one of the bearing brackets 709. The die member 711 is located in the space between the end of the platen 488 and said side bar 2, which as previously mentioned, is provided by spacing said platen from said bar. The die member underlies and supports the marginal edge of the work sheet for the notching operation. A stop arm 712 on the notching blade 710 and a stop screw 713 on the bearing member 709 co-act to establish the normal position of said blade and the shaft 708. A spring 714 connected to the stop arm 712 and to the die member 711, as at 715, tensions said blade and shaft against movement from normal position.

The shaft 708 is rocked in the proper direction from normal position by retraction of the carriage 16, to effect the notching operation. The means for accomplishing this operation includes the before-described coupling dog 660 which is provided with a depending arm 717 adapted, in the effective position of said dog, and during retraction of the carriage 16, to operate a rocker member 718 pivoted, as at 719, to the back of the rear rail 13 of the tilting frame 10 and retained in normal position against a stop 720 by a spring 721. The rocker member 718 is operatively connected to a crank arm 722 fast on the shaft 708, by a slot 723 in said rocker receiving a pin 724 on said crank arm, whereby a releasable connection is provided between said shaft and rocker. The rocker member is so located that the notching operation occurs just prior to the automatic release of the tilting frame 10. Obviously, since the coupling dog 660 is under control of the "Frame release" key 634 and the notching mechanism is operated through the medium of the arm 717 on said dog, the notching mechanism is also under control of the "Frame release" key 634.

Operation

From the foregoing, it will be understood that the motor 178 is normally at rest, and no motion is communicated to the train of shafts and gears connecting the motor with the line space worm shaft 546.

Also, that in the real position of the parts, the line spacing table 502 lies at its extreme forward limit, to which position it is advanced and in which it is yieldingly held, by the springs 506, (Fig. 19).

Furthermore, the one revolution line-space controlling clutch mechanism, including the dog 559, (Figs. 9, 12 and 15-17), and toothed sleeve 556, is normally disengaged, as shown in Fig. 16, the clutch housing 558, and the train of mechanism leading to the line spacing worm shaft 546 being held in locked position by the clutch-tripping member 600.

With the parts at rest and the tilting frame 10 in its lowered, latched position, it will be assumed that the operator wishes to commence a use of the machine according to one of a number of systems for which the machine is adapted.

Figure 2:
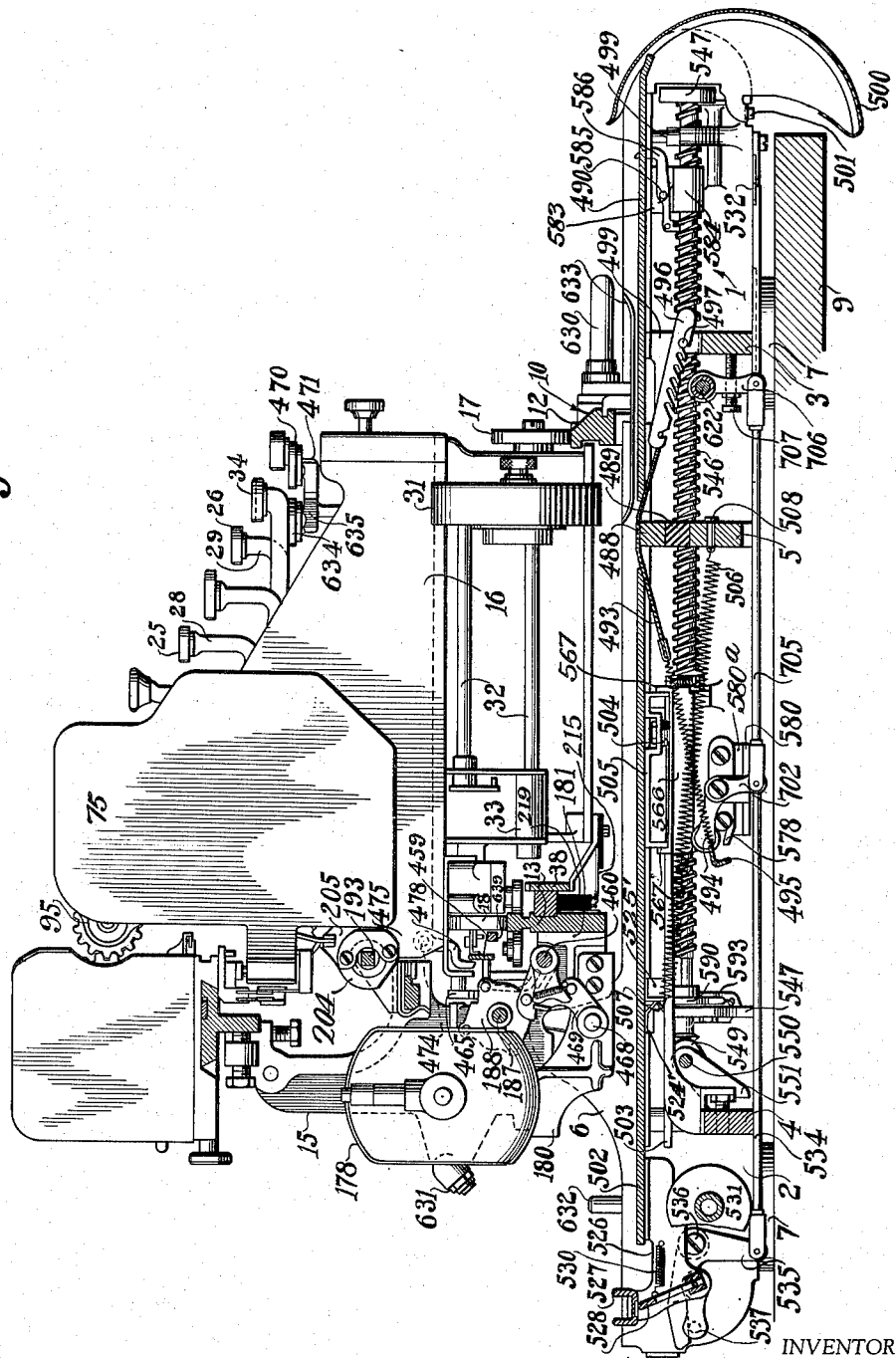
Figure 2 is a view similar to Fig. 1, parts being shown in section.
Figure 3:
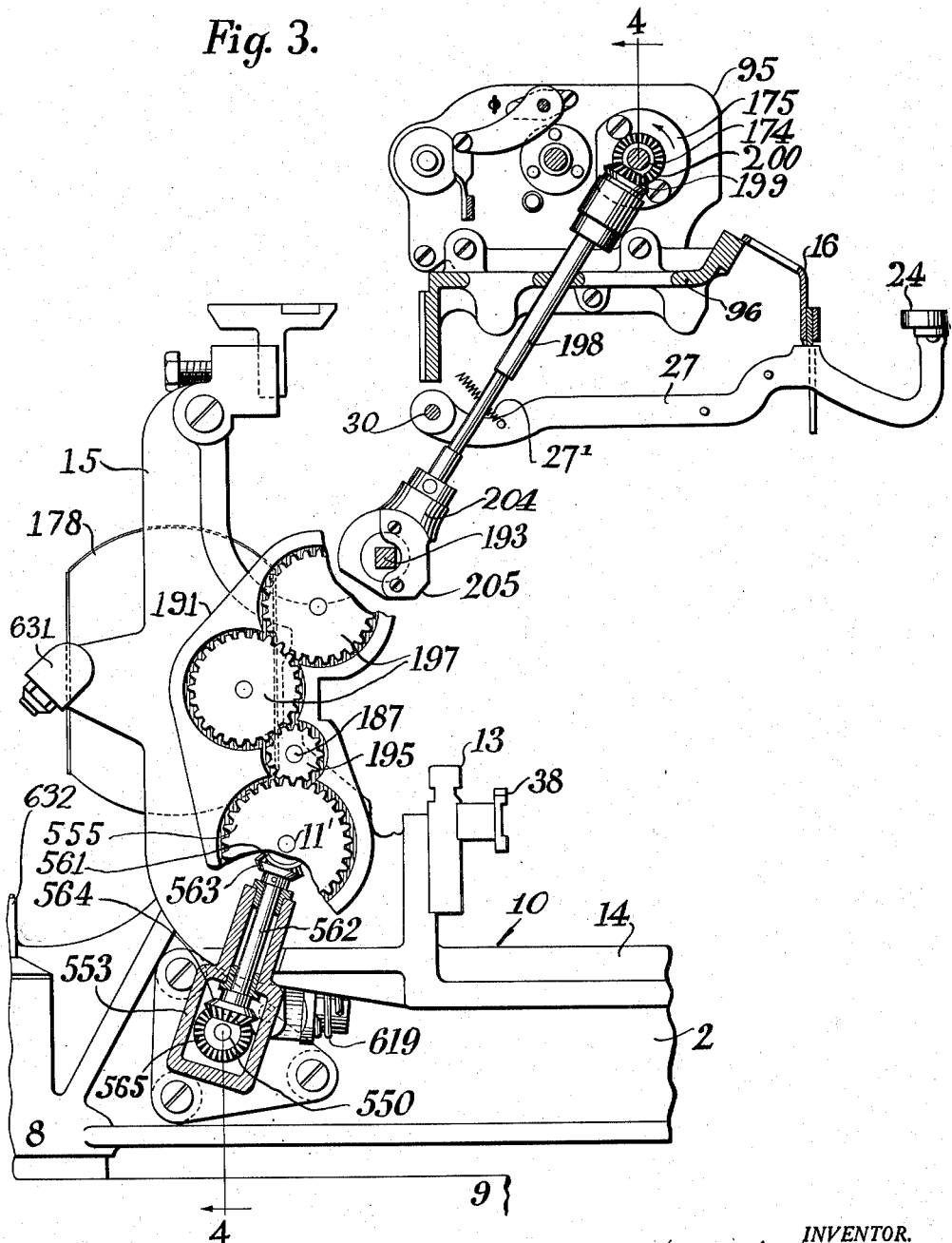
Fig. 3 is a detail view partly in side elevation and partly in section, illustrating the main driving mechanism of the machine.

He will first release the tilting frame 10 by manual operation of the extended finger piece 629, (Figs. 1 and 48), on the left-hand latch 623, whereupon the heavy springs 619, (Fig. 1), rock the tilting frame 10 and the carriage 16 upwardly about the pintles 11, thereby exposing the flat work sheet supporting tables 490 and 502, (Figs. 2 and 19). The tilting frame and carriage rock upwardly until the rear stops 631 projecting rearwardly from the upright rear brackets 15 contact the stationary abutments 632 projecting upwardly from the rear ends of the side bars 2, at which time the tilting frame and carriage lie at a substantially 45° angle relatively to the horizontal frame 1, to afford ready access to the flat tables 490 and 502 for the collation of the work sheets.

As the tilting frame 10 approaches its limit of upward tilting movement, the stud 695, (Figs. 1 and 40), on the rear end of the frame 10, strikes the upwardly projecting beak of the lever 692, (assuming the hand lever 696 to be in enabling position) and rocks such lever until the shoulder 693 contacts the pin 694, (Fig. 60), on the rocker 690 and actuates the train of connections 690, 689, 682, 681, and 683 to press the roll 684 against the flange 685 of the work sheet clamp 509 which rocks the clamp upwardly on its pivot 510, relatively to the tables 490, 502, in the manner of a jaw, and against the tension of its seating spring 519.

The operator now lifts the forwardly projecting web of carbon paper, (not shown), overlying the tables and the platen, and slides beneath it a proof or audit sheet, (not shown), the right hand margin of which is perforated to correspond with the studs 542, (Figs. 19 and 38), on the slides 540. This audit or proof sheet may be of a width sufficient to extend across the full widths of the tables 490 and 502 with its left hand edge projecting beneath the extended forward end of the work clamp 509 and overlying the die 711, (Figs. 19, 53 and 54).

The operator after roughly gauging the proper position to be assumed by the audit sheet on the tables 490, 502, to locate the desired blank printing line over the platen 488, rocks the sheet-retaining bail 543 upwardly, threads the perforated right margin of the sheet onto the studs 542 on the slide 540, and restores the sheet-retaining bail to effective position.

The projecting end of the carbon web is then returned to overlie the audit sheet, it being understood that the audit sheet might be slipped in edgewise beneath the carbon web overlying the tables 490, 502 with little or no disturbance of the carbon sheet.

The bill or statement (not shown) may now be laid on the upper uncoated face of the carbon web, overlying the audit sheet, the left hand edge of the bill sheet being alined against the inner face of the raised work clamp 509, with the desired writing line in alignment with and overhung by the notching blade 710, and hence over the platen 488.

In general, the bill or statement sheet is not sufficiently wide to extend clear across the tables 490, 502, nor is the carbon web sufficiently wide to cover the right hand edge of the audit or proof sheet, so that the operator, by pressure on the upstanding tail 589 of the dog 586, (Figs. 35 and 38), may release the slide 540 from the line space worm shaft 546, to enable him to shift the slide and its thereto-connected audit sheet to position to accurately register the desired blank line of the audit sheet with the blank line of the bill sheet at the printing point, after which the dog 586 is released to reengage the line space shaft 546.

Any excess length of bill sheet and audit sheet may be accommodated by slipping the bottom ends of such sheets endwise between the stationary table 490 and the upper edge of the curved guide and guard 500 and pushing the sheets forwardly so that they will follow the curvature of the guard around the forward edge of the table 490, and be directed rearwardly beneath the table.

The operator may now grasp the hand rail 630, (Figs. 1 and 2), to rock the tilting frame 10 and the carriage 16 downwardly until the keepers 624, (Fig. 52), catch beneath the latches 623, after which the printing point of the carriage, if not already at the desired position to commence a line of writing, is brought thereto by sliding the carriage manually, on the rails 12 and 13, (Fig. 2).

The tilting frame 10, as it is restored to horizontal position withdraws the stud 695, (Fig. 40), from the beak of the lever 692, whereupon the spring 688 returns the clamp-elevating arm 693 and connected parts to their normal positions, assisted by the spring 519 which also acts to seat the work clamping member 509, so that its gripping teeth 515, (Fig. 25), firmly engage the work sheet.

It will be understood, also that the audit or proof sheet need not extend beneath the work clamp 509.

The keys 26, 25, upon depression, effect the printing of the desired data, the carriage 16 letter spacing to the right under control of the usual escapement.

If the entry extends throughout an entire line, the carriage may be automatically returned to the left hand margin, as explained in my U. S. Patent No. 1,904,127, through energization of the motor 178, transmission shaft 186, (Fig. 8), clutch 463, 467, and pinion 464 meshing with the carriage return rack 465, the motor circuit being interrupted and the carriage return clutch members 463, 467 automatically disengaged upon the arrival of the carriage at the left hand margin.

If it is desired to return the carriage to the left hand margin prior to the completion of a line, the operator may depress the carriage return key 470, (Figs. 1, 2 and 45), to close the motor circuit and shift the clutch in the same manner as is effected by the carriage 16 automatically.

According to either method, however, the carriage, as it approaches its limit of return travel, automatically operates the line spacing mechanism to feed the bill and audit sheets rearwardly to position the next writing line thereon over the bar platen 488.

It will be recalled that a lug 619, (Figs. 9, 10 and 18) depends from the traveling carriage 16 to contact the beveled inner end of a lever 614, the outer end of which has a releasable connection with the stem 596 of a line-space controlling key 595.

Contact of the lug with the beveled end of the lever, rocks the latter and thrusts the key stem 596 rearwardly, which shifts the lever 598 clockwise, (Figs. 16 and 17). The lever 598, in turn, by reason of its lateral lip 599, draws the switch control arm 486 rearwardly with its plunger 485, to enable the closing of the motor circuit through switch contacts 480, 481.

Since, in the present explanation, the switch control arm 486 has already been rocked rearwardly by the carriage 16 or by the carriage return key 470 through operation of the bail 459, the arm 598 when rocked rearwardly, as above explained, merely shifts its lip 599 into contact with the retracted arm 486.

Continuing the explanation, the arm 398, (Figs. 12, and 15–17), carrying the elbow lever 605, on its rearward travel, forces the boss 606 of the elbow lever against the laterally turned ear 608 on the upstanding arm of the multiple-armed clutch control lever 600 to rock the lever 600 and cause its hooked arm to release the clutch dog 559, which dog immediately engages the rotating ratchet 600 driven by the energized motor 178 through drive shaft 187, (Figs. 3, 4, 6 and 7), and gear 555, to impart motion to the clutch drum 558, bevelled gears 561, 563, intermediate shaft 562, bevelled gears 564, 565, cross shaft 550, and bevelled gears 549, 548, (Fig. 19), to the line spacing worm shaft 546.

It will be recalled that the movable paper table 502 carrying the work sheet clamp 509, is directly connected with the worm shaft through the bail 566, (Figs. 2, 20, 29–33 and 48), pivoted to the bracket 505 fastened to the underface of the table 502, the bail having a follower 568 normally engaging the worm shaft 546.

Also, it will be remembered that the slide 540, (Figs. 35, 37 and 38) is similarly connected with the worm shaft by the web 583 and dog 586.

Obviously, therefore, the worm shaft 546, when given a complete rotation by the motor, will simultaneously shift rearwardly the table 502 and slide 540 with their thereto-attached bill and audit sheets a full line space to bring the succeeding superposed blank lines on such sheets over the platen 488.

Although the engagement of the depending carriage lug 613, (Figs. 9, 10 and 18), with the line space key control lever 614, occurs near the end of the carriage return travel, the lug 613 maintains engagement with the ear on the lever 614 for a sufficient length of time to prevent premature return of the switch control arm 486, due to the restoration by the carriage of the carriage return bail 459, (Figs. 12, 15-17), and the carriage return clutch 462, (Figs. 7 and 8), and the release of the arm 487.

The free end of the rearwardly extending arm of the elbow lever 605, (Figs. 9, 12, 16 and 17), on the swinging line space clutch control arm 598, extends into the path of the pin 612 projecting from the clutch drum 558, in position to be struck by such pin early in the rotation of the clutch drum, the pin in its passage past the free end of the rearwardly extending arm, operating to rock the elbow lever 605 downwardly against the tension of its spring 609 to cause its boss 606 to release the multiple-armed clutch lever 600 to the action of its spring 602, which immediately returns the hooked clutch dog engaging arm to contact with the closed periphery of the clutch drum 558 in readiness to enter the recess in the periphery of the drum at the end of a single rotation thereof, and disengage the clutch dog 559 from the ratchet 556, and arrest the drum and connected parts.

Meanwhile, after the projecting pin 612 escapes past the end of the elbow lever arm 605, the spring 609 returns the elbow lever to its normal position with relation to the line space control arm 598, and locating the boss 606 in front of the laterally turned lip 608 on the upstanding arm of the multiple-armed clutch dog release lever.

As the carriage 16 completes its return travel to its left hand marginal position, the carriage lug 613 escapes the angular upturned ear on the inner end of the line-space key control lever 614, whereupon the spring 618 restores the lever 614 to normal position with its angular ear in the path of advance of the lug 613, and also restores the line space key 595, and arm 598 to their normal positions.

The arm 598 on its return, frees the switch control arm 486 to the action of the spring 485, (Fig. 9), which advances the arm and its plunger 485 to interrupt the motor circuit.

As the operator depresses the proper keys 25, 26, in writing on the newly positioned blank line, the carriage 16 advances in letter-spacing direction, with its depending lug 613, which strikes the opposite inclined face of the upturned lip on the line space key operating lever 614 and idly rocks the lever counter-clockwise, due to its one-way connection with the stem 596 of the line space key, the spring 618 restoring the lever 614 to normal as the lug 613 escapes the inclined ear.

Should the operator desire to effect line spacing at any point prior to reaching the end of a line of writing, the line space key 595 may be manually pushed inwardly to control the motor circuit switch contacts 480, 481, and the clutch 556, 559 in the same manner as above explained.

As successive entries are made on the bill sheet and audit or proof sheet, the latter will be line spaced rearwardly of the machine, by the table 502 and slide 540, respectively, the table being shifted rearwardly against the tension of its restoring springs 506, (Fig. 19), and carrying with it the carbon roll and web (not shown).

Upon completing the entries to be made on each bill, the operator will depress the frame release key 634, (Figs. 2 and 45), which, has a pin-and-slot connection 636, 637, with the carriage return key 470, to depress the latter as well, the keys being mounted side by side and travelling with the key carriage.

Depression of the frame release key 634, therefore, will operate through the carriage return key to rock the carriage return bail 459, (Figs. 9, 12, and 15 to 17), to throw in the carriage return clutch 462, (Figs. 7 and 8), and release the switch contact 481, to complete the motor circuit and start the carriage on its return.

The frame release key 634, upon depression, rocks its connected latch 662, (Figs. 45 to 47, 53 and 54), to the position shown in Fig. 54, to disengage the nose of the latch, from its seat 664 on the tail of the coupling dog 660 pivoted to the back of the key carriage 16, and to concomitantly tension the spring link 666 connecting the tail of the clutch dog and the latch, to rock the opposite forked end of the dog clockwise from idle to effective position. The operator may remove his finger from the frame release key 634, as the coupling dog 660 will be held where adjusted, by the latch 662, until positively restored.

Now, during the carriage return, with the forked clutch dog in its effective, the lower, offset tine 717 of the forked end of the dog contacts the upper end of the tappet lever 718, (Figs. 45, 53 and 54), pivoted to the rear face of the rear carriage 13, and in its passage, rocks the tappet lever counter-clockwise, (Fig. 45). The tappet lever 718, through its pin and slot connection 723, 724, (Figs. 53 and 54), rocks the arm 722, notching shaft 708, and notching blade 710 clockwise to cause the blade to pass downwardly through the die 711, and notch the left hand margin of the work sheet or sheets directly in line with the last line of printing, the line spacing operation not having occurred at this point in the return travel of the carriage.

As the lower tine 717 escapes past the upper end of the tappet lever 718, the spring 714 returns the notching train to its normal position with the notching blade in the raised position, shown in Fig. 53.

As the key carriage 16 is completing its return travel, the upper tine of the forked dog contacts with the coupling block 661, (Figs. 45-51) adjustably mounted on the longitudinally shiftable release rod 639, to shift the latter to the left, thereby rocking the frame release train of mechanism including lever 641, link 647 and finger 648, to force the thrust rod 650 inwardly.

The thrust rod by reason of its connection to the depending crank 651, (Fig. 48), fast on the shaft 652, rocks the shaft counter-clockwise to cause its arm 657 to contact the opposing arm 656 on the sleeve 655 journaled on the frame latching shaft 622 supported near the front of the machine in bearings in the side bars 2.

The stud 658 on the tail of the arm 656 thereupon contacts the depending arm 626 on the frame latching shaft 622 to rock the latching shaft clockwise, and thus automatically disengage the latches 623 from their keepers 624, (Fig. 52), whereupon the strong elevating springs 619, (Fig. 1), are freed to tilt the frame 10 and key carriage upwardly about the pintles 11 as centres, to a substantially 45 degree angle relatively to the tables 490 and 502.

The tilting frame, as it rises, causes its stud 695 (Fig. 40), to rock the work clamp 509 upwardly, as heretofore explained, thus releasing the work and exposing the tables for the ready removal of the printed sheet and substitution of others.

Simultaneously, with the release of the frame latches 623, (Fig. 48), the rotation of the sleeve 655 by the arm 657, rocks the arm 706 fast on the opposite end of the sleeve.

This rocking motion is communicated through the link 705 connecting the arm 706 to one arm of the release lever 702, the remaining arm of which carries a roll 704 normally lying in contact with the rocking bail 566 connecting the traveling line space table 502 with the line spacing worm shaft 546, the bail maintaining its contact with the roll in any position to which the traveling line spacing table may be shifted.

The roll-carrying lever 702, when rocked clockwise, (Fig. 48), incidentally to the release of the frame latches, rocks the line space bail 566 upwardly to disengage the traveling table 502 from the line spacing worm shaft 546, whereupon, if the line spacing table has been fed rearwardly to line space the work sheets carried thereby, the springs 506, (Fig. 19), operate to advance the line spacing table and the work sheets to their initial positions.

To insure the return of the traveling table 502 to its normal advanced position under the influence of the return springs 506 upon the release of the follower 568 by the release lever 702 without interference which might be occasioned by a premature engagement of the follower with the line spacing worm shaft 546, the latch 575 takes over the follower arm forming one side of the bail 566, as soon as the follower is disengaged from the worm shaft, the latch retaining the follower in its disengaged position until, as the table 502 reaches its normal position, the tail 579 of the latch contacts the stationary abutment 578, and is thereby rocked to idle position to release the follower, which under the influence of the spring 569 is again engaged with the line spacing worm shaft.

As the coupling dog 660 on the key carriage completes its actuation of the frame release latches 623 and the disengagement of the line spacing table 502 and its line spacing shaft 546, a stud 671, (Fig. 46), on the coupling dog 660 which has been riding up the inclined end of the cam shoe 669 on the adjustable left hand carriage stop 670, to lift the upper tine of the forked dog out of engagement with the coupling block 661, finally effects such disengagement, thereby freeing the release rod 639 to the action of its restoring spring 644, (Figs. 45 and 55), which immediately returns the release rod, lever 642, link 647 and presser finger 648 to their normal positions.

Withdrawal of the presser finger to its normal position frees the frame release train including the thrust rod 650, shaft 652 and sleeve 655 for return to their normal positions by the springs 654, and 658', (Fig. 49), the pin 658 on arm 656 of the sleeve receding from the arm 626 of the latching shaft 622, to enable the spring 625 to restore the shaft and latches 623 to position to engage the keepers 624 when the tilting frame 10 and carriage 16 is swung downwardly to printing position.

The sleeve 655, as it rotates counter-clockwise on the latch-supporting shaft 622, with its arm 706, operates through the link 705, to rock the line-space disabling lever 702 in like direction to release the bail 566 connecting the traveling table 502 with the line space work shaft 546, whereupon the spring 569, (Figs. 30–32), rocks the bail to engage its follower arm 568 with the line spacing worm shaft.

Release of pressure on the frame release key 634, (Fig. 45), enables the spring 638 to restore the key lever 635, the rear end of which rocks downwardly relatively to the link 667 due to the slot 668, and upon the positive restoration of the coupling dog 660 to normal position by contact of its pin 671 with the inclined face of the cam shoe 669, the latch 662 rides over the hump between the seats 664 and 665 on the coupling dog and settles on the seat 664 under the influence of the spring 666, drawing the link 667 downwardly relatively to the seat 668.

The machine is now in condition to enable the operator to remove the written sheets and substitute others.

Means for locating the work sheet

Upstanding from the fixed clamping member 512' and one line space to the rear of the notching blade 710, is a locator lug 725, (Figs. 40, 42 and 43) for cooperation with the notch formed in the marginal edge of the work sheet when the sheet is replaced in the machine. The position of the locator lug 725 with relation to the platen is such that when a notch is engaged therewith, the work sheet is in position for the printing of the next line.

The foregoing constitutes a detailed description of a preferred embodiment of my invention, but right is herein reserved to such changes and modifications as fall fairly within the scope of the appended claims.

What I claim is:

1. In a machine of the class described, the combination with a base, means thereon for supporting and feeding the work, a tilting frame on the base, a carriage travelling on the frame, and printing mechanism on the carriage, of a single motor for retracting the carriage and operating said means, mounted on the frame for direct connection to said carriage, and operatively connected to said means in any position of the frame.

2. In a machine of the class described, the combination with work supporting means; and a carriage having printing mechanism thereon; of a tilting frame supporting the carriage for travel over the work; power means to raise the frame; and means under control of the carriage in its travel to different positions, and settable according to such different positions, to enable the power means.

3. In a machine of the class described, the combination with work supporting means; and a carriage having printing mechanism thereon; of a tilting frame supporting said carriage for travel over the work; power means tending to tilt said frame, and means to restrain the frame against tilting, the last named means being releasable by the carriage to free said frame for tilting.

4. In a machine of the class described, the combination with work supporting means; and a carriage having printing mechanism thereon; of a tilting frame supporting said carriage for travel over the work; power means tending to tilt said frame; a key on the carriage; and means to restrain the frame against tilting; the last-named means being releasable by the carriage under control of said key to free said frame.

5. In a machine of the class described, the combination with work supporting means; and a carriage having printing mechanism thereon; of a tilting frame supporting the carriage for advance and retraction over the work; carriage retracting mechanism, including a carriage retracting key; means tending to tilt said frame;

means operative by the carriage during retraction thereof to control tilting of the frame; and a key, operatively connected to the carriage retracting key, for controlling said last-named means.

6. In a machine of the class described, the combination with work supporting means; and a carriage having printing mechanism thereon; of a tilting frame supporting the carriage for travel over the work; power means tending to tilt said frame from normal position; means for retaining the frame in normal position, including latches movable to effective and ineffective positions, respectively; and carriage-operated means for moving said latches to one of said positions.

7. In a machine of the class described, the combination with work supporting means; and a carriage having printing mechanism thereon; of a tilting frame supporting the carriage for travel over the work; power means tending to tilt said frame from normal position; means for retaining the frame in normal position, including latches; and carriage-operated latch-releasing mechanism.

8. In a machine of the class described, the combination with work supporting means; and a carriage having printing mechanism thereon; of a tilting frame supporting said carriage for travel over the work; power means tending to tilt the frame; means for restraining the frame against tilting movement, including frame latches; normally ineffective carriage-operated latch-releasing mechanism; and means, including a key on the carriage, to render said latch-releasing mechanism effective.

9. In a machine of the class described, the combination with work supporting means; and a carriage having printing mechanism thereon; of a tilting frame supporting the carriage for travel over the work; power means tending to tilt the frame; means to restrain the frame against tilting, including frame latches; latch-releasing mechanism; and means to couple the latch-releasing mechanism to the carriage for operation thereby.

10. In a machine of the class described, the combination with work supporting means; and a carriage having printing mechanism thereon; of a tilting frame supporting said carriage for travel over the work; power means tending to tilt said frame; means to restrain the frame against tilting, including frame latches; latch-releasing mechanism; and means to couple the latch-releasing mechanism to the carriage for operation thereby at selected points in the travel of said carriage, 11. In a machine of the class described, the combination with work supporting means; and a carriage having printing mechanism thereon; of a tilting frame supporting said carriage for travel over the work; power means tending to tilt the frame; means to restrain the frame against tilting, including frame latches; latch-releasing mechanism; means to couple the latch-releasing mechanism to the carriage for operation thereby, including a normally ineffective coupling member on the carriage; and means, including a manipulative member, for rendering said coupling member effective.

12. In a machine of the class described, the combination with work supporting means; and a carriage having printing mechanism thereon; of a tilting frame supporting said carriage for travel over the work in opposite directions, respectively; power means tending to tilt said frame; means for restraining the frame against tilting, including frame latches; and carriage-operated latch-releasing mechanism, including cooperating coupling members, coupled and uncoupled by travel of the carriage in one direction.

13. In a machine of the class described, the combination with work supporting means; and a carriage having printing mechanism thereon; of a tilting frame supporting said carriage for advance and retraction over the work; means for retracting the carriage to different marginal positions; and means for tilting the frame in timed relation to retraction of the carriage to said different marginal positions.

14. In a machine of the class described, the combination with work supporting means; and a carriage having printing mechanism thereon; of a tilting frame supporting the carriage for travel over the work; means for marking the work to indicate a line position thereon; and means for tilting the frame to expose the work to view, said two last-named means rendered effective by the carriage in its travel.

15. In a machine of the class described, the combination with work supporting means; and a carriage having printing mechanism thereon; of a tilting frame supporting the carriage for travel over the work; means for marking the work to indicate a line position thereon; and means for tilting the frame to expose the work to view, said two last-named means rendered effective successively by the carriage in its travel.

16. In a machine of the class described, the combination with work supporting means; and a carriage having printing mechanism thereon; of a tilting frame supporting the carriage for travel over the work; manipulative means on said carriage, means for marking the work to indicate a line position thereon; and means for tilting the frame to expose the work to view, said two last-recited means rendered effective by the carriage in its travel under control of said manipulative means.

17. In a machine of the class described, the combination with work supporting means; and clamping means for securing the work to the supporting means; a carriage having printing mechanism thereon; of a tilting frame supporting the carriage for travel over the work; and means rendered effective by travel of the carriage for marking the work to indicate a line position thereon, tilt the frame to expose the work to view, and release the clamping means to permit removal of the work from the supporting means.

18. In a machine of the class described, the combination with work supporting means; clamping means for securing the work to the supporting means; and a carriage having printing mechanism thereon; of a tilting frame supporting the carriage for travel over the work; a manipulative means; work notching means; frame tilting means; and clamp releasing means, all rendered effective successively by the carriage in its travel, and under control of said manipulative means.

19. In a machine of the class described, the combination with work supporting means, and a travelling carriage; of carriage-operated notching mechanism for forming a notch in a work sheet imposed upon said supporting means.

20. In a machine of the class described, the combination with work supporting means; a travelling carriage; and manipulative means; of notching mechanism operative by the carriage in its travel, and under control of said manipulative means, to notch a work sheet imposed upon the work supporting means.

21. In a machine of the class described, the combination with work supporting means; a travelling carriage; and normally ineffective carriage-propelling means; of work notching mechanism operative by the carriage in its travel, to notch a work sheet imposed upon said supporting means; and normally disabled against carriage operation; and a single manipulative means to render the carriage-propelling means effective, and to condition the work notching mechanism for carriage operation.

22. In a machine of the class described, the combination with work supporting means; and a carriage having printing mechanism thereon, and movable over said means in letter and contra-letter feed directions, respectively, in the printing of lines of writing by said printing mechanism; of work notching mechanism, operative by the carriage when traveling in one direction, to notch a work sheet imposed upon said supporting means in line with the line of writing.

23. In a machine of the class described, the combination with work supporting means; and a carriage having printing mechanism thereon, and movable over said supporting means in letter and contra-letter feed directions, respectively, in the printing of lines of writing by said printing mechanism; of work notching mechanism operative by the carriage to notch a work sheet imposed on said supporting means in line with the line of printing; and a sheet locator positioned on said supporting means for cooperation with said notch to locate the sheet in next line position.

24. In a machine of the class described, the combination with a work sheet support and printing mechanism, relatively and bodily movable in letter-spacing direction and return, in the printing of successive lines of writing; of work notching means operative by relative movement of said support and printing mechanism in return letter-spacing direction.

25. In a machine of the class described, the combination with a work sheet support, and printing mechanism, relatively movable in the printing of lines of writing; of a tilting frame supporting the printing mechanism; frame tilting mechanism controlled by relative movement of said support and printing mechanism; and sheet clamping means mounted on said work support, and operative by said tilting frame to release the work.

26. In a machine of the class described, the combination with a work sheet support, and printing mechanism, relatively movable, in the printing of lines of writing; of a tilting frame supporting the printing mechanism; frame-tilting mechanism controlled by relative movement of said support and printing mechanism; work clamping means associated with said work support; and means, operative by the tilting frame to actuate the work clamping means to release the work; and means for disabling at will the control of the work clamping means by the tilting frame.

27. In a machine of the class described, the combination with a work sheet support, and printing mechanism, relatively movable, in the printing of lines of writing; of a tilting frame supporting the printing mechanism; frame tilting mechanism controlled by relative movement of said support and printing mechanism; work clamping means associated with said support; means for operating the work clamping means to release the work, operative by said tilting frame; and a manipulative means operable at will, to disable the control of the work clamping means by the tilting frame.

28. In a machine of the class described, the combination with printing mechanism; of a tilting frame supporting said printing mechanism; a work sheet support movable to line space the work; a motor on the frame; and driving connections between the motor and said support.

29. In a machine of the class described, the combination with printing mechanism; of a tilting frame supporting said mechanism; a work sheet support movable to line space the work sheet; a motor on the frame; and driving connections between the motor and said support for moving the latter step by step.

30. In a machine of the class described, the combination with printing mechanism; of a tilting frame supporting said mechanism; a work sheet support movable in one direction to line space the work, and in the opposite direction for return to starting position; a motor; driving connections between the motor and said support for moving the latter in one direction by operation of said motor; and motor means for moving said support in the opposite direction free of said driving connections.

31. In a machine of the class described, the combination with printing mechanism; of work and proof sheet carriers, respectively, one movable independently of the other for selective collation of the work and proof sheets, and both movable in unison; and driving mechanism common to both carriers for moving them in unison.

32. In a machine of the class described, the combination with a work sheet support movable to feed the work; and a carriage having printing mechanism thereon; of a tilting frame supporting said carriage for travel over the work; frame tilting mechanism operative under control of said carriage; and a power drive for said support rendered ineffective as a condition precedent to tilting of said frame.

33. In a machine of the class described, the combination with a work sheet support movable to feed the work; and a carriage having printing mechanism thereon; of a tilting frame supporting said carriage for travel over the work; a motor; and driving connections between the motor and said support, controlled by said carriage, to impart a step by step movement to said support.

34. In a machine of the class described, the combination with a work sheet support movable to feed the work; and a carriage having printing mechanism thereon; of a tilting frame supporting the carriage for travel over the work; a motor; driving connections between said motor and support for imparting a step by step movement to the latter by operation of said motor; and means, including a manipulative member, to control said connections.

35. In a machine of the class described, the combination with a work sheet support movable to feed the work; and a carriage having printing mechanism thereon; of a tilting frame supporting the carriage for travel over the work; a motor; driving connections between the motor and said support for imparting a step by step movement to the latter by operation of said motor;

and means, including a manipulative member, for controlling both said motor and connections.

36. In a machine of the class described, the combination with a work sheet support movable to feed the work; and a carriage having printing mechanism thereon; of a tilting frame supporting the carriage for travel over the work; power means for tilting said frame, under control of, and in selected positions of, said carriage; a motor; and driving connections between said motor and work support rendered ineffective by travel of said carriage as a condition precedent to tilting of said frame.

37. In a machine of the class described, the combination with a work sheet support movable to feed the work; and a carriage having printing mechanism thereon; of a tilting frame supporting the carriage for travel over the work; power means for tilting the frame, under control of said carriage; a motor; and driving connections between said motor and work support, rendered ineffective to drive the latter by travel of said carriage as a condition precedent to tilting of the frame.

38. In a machine of the class described, the combination with a work sheet support movable to feed the work; and a carriage having printing mechanism thereon; of a tilting frame supporting the carriage for travel over the work; power means for tilting the frame, under control of the carriage; a motor; driving connections between said motor and work support, including a drive disconnecting member; and means operative by the carriage, and operating said drive disconnecting member as a condition precedent to tilting of the frame.

39. In a machine of the class described, the combination with a work sheet support movable to feed the work; and a carriage having printing mechanism thereon; of a tilting frame supporting the carriage for travel over the work; power means for tilting the frame; latching mechanism for restraining said frame against tilting, and operative to release said frame; a motor; driving connections between said motor and support, including a member operative to disconnect the drive; and a carriage-operated means for actuating said latching mechanism and drive disconnecting member to release said frame, and to disconnect said drive.

40. In a machine of the class described, the combination with a work sheet support; and a carriage having printing mechanism thereon; of a tilting frame supporting said carriage for advance and retraction over the work; a motor; driving connections between the motor and support, including a member operative to drive-disconnecting position; and means operative by retraction of the carriage to operate said member to drive-disconnecting position.

41. In a machine of the class described, the combination with a work sheet support movable to feed the work, and for retraction to normal position; a carriage having printing mechanism thereon, and adapted to be advanced and retracted over the work; and a motor; of driving connections between the motor and said work support for moving the latter by operation of the motor, to feed the work, including a member operative to a drive-disconnecting position; means operative by retraction of the carriage, to shift the member to said position; and a power means for retracting the support, and operative upon disconnection of said drive.

42. In a machine of the class described, the combination with a work sheet support movable to feed the work; and a carriage having printing mechanism thereon; of a tilting frame supporting the carriage for advance and retraction over the work; latching mechanism for restraining the frame against tilting, and movable by retraction of the carriage to a frame-releasing position; a motor; and driving connections between the motor and said work support, including a member movable to drive-disconnecting position by movement of said latching mechanism to frame-releasing position.

43. In a machine of the class described, the combination with a work sheet support movable to feed the work, and for retraction to normal position; a carriage having printing mechanism thereon, and adapted for advance and retraction over the work; and a motor; of driving connections between the motor and said work support, including a member movable to drive-disconnecting position by retraction of the carriage; and means for automatically retracting said support when said member is moved to drive-disconnecting position.

44. The combination with a travelling carriage; and means to print on work sheets; of means to mark the work sheets to indicate a line position thereon; and means operable by the travelling carriage to render the marking means effective.

45. The combination with a travelling carriage; and means to print on work sheets; of means to mark the work sheets to indicate a line position thereon; clamping means to hold the work sheets in place; and means operable by the carriage to actuate the marking means, and to displace the clamping means relatively to the work sheets.

46. The combination with a travelling element; and means to print on a work sheet; of work notching means operable by the travelling element, to notch the work sheet to indicate a particular line on the work sheet; and a sheet locator positioned for cooperation with the notch to locate the sheet relatively to the printing mechanism.

47. The combination with a work sheet supporting device, and a printing device relatively movable in the printing of lines; work-clamping means associated with the work support; means, the operation of which may be initiated by the movable device, to cause the clamping means to release the work; and means to disable at will, the control of the work-clamping means by the movable device.

48. The combination with printing mechanism; of a work sheet support movable in one direction from its starting position, to line space the work, and in the opposite direction to return to its starting position; a motor; driving connections between the motor and the work-support to move the latter step by step from its starting position; and motor means to return the work-support uninterruptedly to its starting position free of said driving connections.

49. The combination with a work sheet support movable to feed the work; and a motor; of driving connections between the motor and the work support to impart a step by step travel to the latter; and means, including a manipulative member, to control both the motor and the driving connections.

50. In a writing machine, the combination with work supporting means; a carriage; and a tiltable frame on which the carriage is supported;

and a motor to propel the carriage in one direction; of normally ineffective means to tilt the frame; a control member to condition the motor for operation; and carriage-operated means settable by the control member incident to conditioning the motor for operation, to enable the normally ineffective frame tilting means to operate.

51. In a writing machine, the combination with work supporting means; and a carriage; of a tilting frame to support the carriage, and relatively to which the carriage travels in letter spacing direction; a motor to return the carriage towards the beginning of a line; and means to tilt the frame; of normally effective means to prevent operation of the frame-tilting means; a control member; and separate means settable thereby to condition the motor to return the carriage, and to shift the normally effective preventing means to free the frame-tilting means for operation.

52. In a writing machine, the combination with work supporting means; and a carriage; of a tilting frame to support the carriage, and relatively to which the carriage travels in letter spacing direction; a motor to return the carriage in contra-letter spacing direction to the beginning of a line; means to tilt the frame; and means to retain the tilting frame in horizontal position; of a control member; and separate means settable by the control member, to condition the motor to return the carriage, and to effect the release of the frame-retaining means incidental to such carriage return travel.

53. In a writing machine having a platen, the combination with relatively movable work-supporting, and printing mechanisms; of means operable by the movable mechanism to perforate the work sheet mounted upon the work-supporting mechanism; and means associated with the work-supporting mechanism to coact with any of the perforations thus formed in a work sheet previously printed upon, when again inserted in the machine to enable the work sheet to be positioned with any previously written line at the printing line of the platen, as well as with the next blank line at such printing line.

54. In a writing machine, the combination with relatively movable work-supporting, and typing mechanisms; of selective means to initiate such relative movement; and means operable incident to such relative movement, when initiated through one of said selective means, to perforate the work sheet mounted upon the work-supporting mechanism.

55. In a writing machine, the combination with a suitable base; a frame connected to the support to shift relatively thereto; printing mechanism supported on the frame to shift therewith and relatively thereto; and a motor; of a work support mounted to travel on the base in line spacing direction and return; releasable drive connections normally effective between the work support and motor; and means controlled by the printing mechanism to engage and disengage the drive connections.

56. In a writing machine, the combination with a suitable base; a frame connected to the support to shift relatively thereto; printing mechanism supported on the frame to shift therewith and relatively thereto; and a motor; of a work support mounted to travel on the base in line spacing direction and return; releasable drive connections normally effective between the work support and motor; drive connections between the motor and printing mechanism; means to retain the shiftable frame in operative position relatively to the work support; and settable means carried by the printing mechanism to release the frame-retaining means, and to disengage the drive connections between the work support and the motor.

57. In a writing machine, the combination with a suitable base; a frame connected to the support to shift relatively thereto; printing mechanism supported on the frame to shift therewith and relatively thereto; and a motor; of a work support mounted to travel on the base in line spacing direction and return; releasable drive connections normally effective between the work support and motor; a releasable work clamp on the work support; normally idle work sheet marking means; drive connections between the motor and printing mechanism; means to retain the shiftable frame in operative position relatively to the work support; settable means carried by the printing mechanism to actuate the marking means, release the frame-retaining means, and disengage the drive connections between the work support and the motor; and means operable by the shifting frame to release the work clamp.

58. In a writing machine, the combination with printing mechanism; and a motor; of a shiftable frame to support the printing mechanism; a work support shiftable in line spacing direction and return; normally effective driving connections between the motor and the work support to shift the latter in one direction; a second motor; and settable means operable by the printing mechanism to disengage the driving connections between the first-named motor and the work support, to free the work support for return to normal position by the second named motor.

HARRY A. FOOTHORAP.